(12) United States Patent
Meriaz et al.

(10) Patent No.: US 11,127,222 B2
(45) Date of Patent: Sep. 21, 2021

(54) AUGMENTED REALITY ENVIRONMENT FOR TECHNICAL DATA

(71) Applicant: MBTE HOLDINGS SWEDEN AB, Gothenburg (SE)

(72) Inventors: Ran Meriaz, Warner Robins, GA (US); Yoram Meriaz, Tel-Aviv (IL); Alexander Tkachman, Holon (IL)

(73) Assignee: MBTE HOLDINGS SWEDEN AB, Goeteborg (SE)

( * ) Notice: Subject to any disclaimer, the term of this patent is extended or adjusted under 35 U.S.C. 154(b) by 0 days.

(21) Appl. No.: 16/992,495

(22) Filed: Aug. 13, 2020

(65) Prior Publication Data

US 2021/0049822 A1    Feb. 18, 2021

Related U.S. Application Data

(60) Provisional application No. 62/887,735, filed on Aug. 16, 2019.

(51) Int. Cl.
*G09G 5/00* (2006.01)
*G06T 19/00* (2011.01)
*G06T 7/70* (2017.01)
*G06F 3/0484* (2013.01)
*G06F 3/0482* (2013.01)
*G06T 11/00* (2006.01)

(52) U.S. Cl.
CPC .......... *G06T 19/006* (2013.01); *G06F 3/0482* (2013.01); *G06F 3/04842* (2013.01); *G06T 7/70* (2017.01); *G06T 11/00* (2013.01); *G06T 2200/24* (2013.01)

(58) Field of Classification Search
CPC ..... G06F 3/0482; G06F 3/04842; G06T 7/70; G06T 11/00; G06T 19/006
See application file for complete search history.

(56) References Cited

U.S. PATENT DOCUMENTS

| | | | |
|---|---|---|---|
| 2015/0062123 A1* | 3/2015 | Yuen | G06T 19/20 345/420 |
| 2018/0122118 A1 | 5/2018 | Dotterweich et al. | |
| 2019/0066538 A1 | 2/2019 | Chao et al. | |
| 2019/0097896 A1* | 3/2019 | Kritzler | H04L 41/22 |

* cited by examiner

*Primary Examiner* — Charles Tseng
(74) *Attorney, Agent, or Firm* — Alston & Bird LLP

(57) ABSTRACT

Embodiments of the present disclosure involve providing an augmented reality environment to a user interacting with technical data associated with a powered asset. In various embodiments, a digital model of the powered asset is displayed via an augmented reality user interface that displays the model superimposed over the user's line of vision to simulate the augmented reality environment. Input is received from the user selecting a topic of a component of the model that comprises instructions for performing a task related to the component. Responsive to receiving the input, the instructions are displayed on the interface and the instructions identify a tool used in performing the task. Responsive to the user moving her line of vision to view a non-powered asset in which the tool is located, a visual representation of the tool is displayed on the interface superimposed over the non-powered asset viewable in the user's line of vision.

21 Claims, 22 Drawing Sheets

AUGMENTED REALITY ENVIRONMENT FOR TECHNICAL DATA

CROSS-REFERENCE TO RELATED APPLICATIONS

This application claims the benefit of U.S. Provisional Patent Application Ser. No. 62/887,735, filed Aug. 16, 2019, which is incorporated herein by reference in its entirety, including any figures, tables, and drawings.

TECHNICAL FIELD

The present application relates to providing an augmented reality environment to a user interacting with technical data.

BACKGROUND

Technical Manuals and other technical data generally hold large amounts of information that can include multiple volumes and hundreds or thousands of data modules when in electronic format. When users of technical manuals, or other technical data that are provided electronically, need to look for a specific subject, they need to go over a lengthy electronic Table of Contents, similar to a paper book, but using links, which can include nested subsystems (and sub-subsystems) within systems. This requires the users to know not only the exact nomenclature of the item they seek (many times this is unknown), but how to navigate through the seemingly endless array of nested data. This results in a lot of time spent by the reader, trying to look in many different places (and sometimes, out of exasperation, just look from A to Z) to find the information, which results in inefficiency, loss of time and waste of expensive resources. Further, enhancements can be provided to the reader by providing augmented/mixed reality environmental features to further assist the reader in making use of needed information once found in such technical manuals.

Thus, a need exists for efficiently providing technical information to users in a user-friendly manner that make use of an augmented/mixed reality environment that that overcomes the challenges of current systems.

BRIEF SUMMARY

Embodiments of the present disclosure provide methods, apparatus, systems, computer program products and/or the like for providing an augmented reality environment to a user interacting with technical data associated with a powered asset. In accordance with one aspect of the present disclosure, a method for providing an augmented reality environment to a user interacting with technical data associated with a powered asset is provided. In various embodiments, the method comprises: causing display, by one or more processors of a user computing entity, of at least a portion of a digital model of the powered asset via an augmented reality user interface executing on the user computing entity, wherein (a) the augmented reality user interface is configured to display the portion of the digital model superimposed over at least a portion of a line of vision for the user to simulate the augmented reality environment, (b) the portion of the digital model comprises one or more components of the powered asset, and (c) the one or more components are selectable via the augmented reality user interface; receiving, by the one or more processors, first input of the user selecting a component of the one or more components; responsive to receiving the first input, causing display, by the one or more processors, of a plurality of topics associated with the component via the augmented reality user interface, wherein (a) the augmented reality user interface is configured to display the plurality of topics superimposed over at least a portion of the line of vision for the user and (b) each of the plurality of topics is selectable via the augmented reality user interface; receiving, by the one or more processors, second input of the user selecting a topic of the plurality of topics, wherein the topic of the plurality of topics comprises instructions for performing a task with respect to the component; responsive to receiving the second input, causing display, by the one or more processors, of the instructions for performing the task on the augmented reality user interface, wherein (a) the augmented reality user interface is configured to display the instructions superimposed over at least a portion of the line of vision for the user and (b) the instructions identify a tool used in performing at least one of the instructions; and responsive to the user moving the line of vision to view a non-powered asset in which the tool is located, causing display, by the one or more processors, of a visual representation of the tool on the augmented reality user interface, wherein the augmented reality user interface is configured to display the visual representation of the tool superimposed over the non-powered asset viewable in the line of vision for the user.

In accordance with another aspect of the present disclosure, a computing system is provided. In various embodiments, the computing system comprises at least one processor and at least one non-transitory memory including program code. The at least one non-transitory memory and the program code are configured to, with the at least one processor, cause the computing system to at least: cause display of at least a portion of a digital model of the powered asset via an augmented reality user interface executing on the user computing entity, wherein (a) the augmented reality user interface is configured to display the portion of the digital model superimposed over at least a portion of a line of vision for the user to simulate the augmented reality environment, (b) the portion of the digital model comprises one or more components of the powered asset, and (c) the one or more components are selectable via the augmented reality user interface; receive first input of the user selecting a component of the one or more components; responsive to receiving the first input, cause display of a plurality of topics associated with the component via the augmented reality user interface, wherein (a) the augmented reality user interface is configured to display the plurality of topics superimposed over at least a portion of the line of vision for the user and (b) each of the plurality of topics is selectable via the augmented reality user interface; receive second input of the user selecting a topic of the plurality of topics, wherein the topic of the plurality of topics comprises instructions for performing a task with respect to the component; responsive to receiving the second input, cause display of the instructions for performing the task on the augmented reality user interface, wherein (a) the augmented reality user interface is configured to display the instructions superimposed over at least a portion of the line of vision for the user and (b) the instructions identify a tool used in performing at least one of the instructions; and responsive to the user moving the line of vision to view a non-powered asset in which the tool is located, cause display of a visual representation of the tool on the augmented reality user interface, wherein the augmented reality user interface is configured to display the visual representation of the tool superimposed over the non-powered asset viewable in the line of vision for the user.

In accordance with yet another aspect of the present disclosure, a non-transitory computer storage medium is provided. In various embodiments, the non-transitory computer storage medium comprises instructions stored thereon. The instructions being configured to cause one or more processors to at least perform operations configured to: cause display of at least a portion of a digital model of the powered asset via an augmented reality user interface executing on the user computing entity, wherein (a) the augmented reality user interface is configured to display the portion of the digital model superimposed over at least a portion of a line of vision for the user to simulate the augmented reality environment, (b) the portion of the digital model comprises one or more components of the powered asset, and (c) the one or more components are selectable via the augmented reality user interface; receive first input of the user selecting a component of the one or more components; responsive to receiving the first input, cause display of a plurality of topics associated with the component via the augmented reality user interface, wherein (a) the augmented reality user interface is configured to display the plurality of topics superimposed over at least a portion of the line of vision for the user and (b) each of the plurality of topics is selectable via the augmented reality user interface; receive second input of the user selecting a topic of the plurality of topics, wherein the topic of the plurality of topics comprises instructions for performing a task with respect to the component; responsive to receiving the second input, cause display of the instructions for performing the task on the augmented reality user interface, wherein (a) the augmented reality user interface is configured to display the instructions superimposed over at least a portion of the line of vision for the user and (b) the instructions identify a tool used in performing at least one of the instructions; and responsive to the user moving the line of vision to view a non-powered asset in which the tool is located, cause display of a visual representation of the tool on the augmented reality user interface, wherein the augmented reality user interface is configured to display the visual representation of the tool superimposed over the non-powered asset viewable in the line of vision for the user.

In particular embodiments, causing display of the visual representation of the tool superimposed over the non-powered asset viewable in the line of vision for the user may be performed by reading a unique tracking identifier for the non-powered asset, determining a location of the non-powered asset is in the line of vision of the user based on the reading of the unique tracking identifier, and causing display of the visual representation of the tool superimposed over the non-powered asset, wherein the tool is associated with the non-powered asset so that the tool is considered to be located where the non-powered asset is located. In some embodiments, the non-powered asset may comprise a beacon configured to at least one of transmit or advertise data comprising the unique tracking identifier. In other embodiments, the non-powered asset may comprise a tag comprising the unique tracking identifier configured to be scanned. In other embodiments, causing display of the visual representation of the tool superimposed over the non-powered asset viewable in the line of vision for the user may be performed by reading a unique tracking identifier for the tool, determining a location of the tool is in the line of vision of the user based on the reading of the unique tracking identifier, and displaying the visual representation of the tool superimposed over the non-powered asset based on the location of the tool.

In various embodiments, telematics data for the component may be received from the powered asset. In these particular embodiments, the telematics data may be displayed on the augmented reality user interface, wherein the augmented reality user interface is configured to display the telematics data superimposed over at least a portion of the line of vision for the user. In some embodiments, a determination may be performed to identify specific data from the telematics data is related to performing the task. In these embodiments, the telematics data may be displayed on the augmented reality user interface, wherein the augmented reality user interface is configured to display the specific data superimposed over at least a portion of the line of vision for the user.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
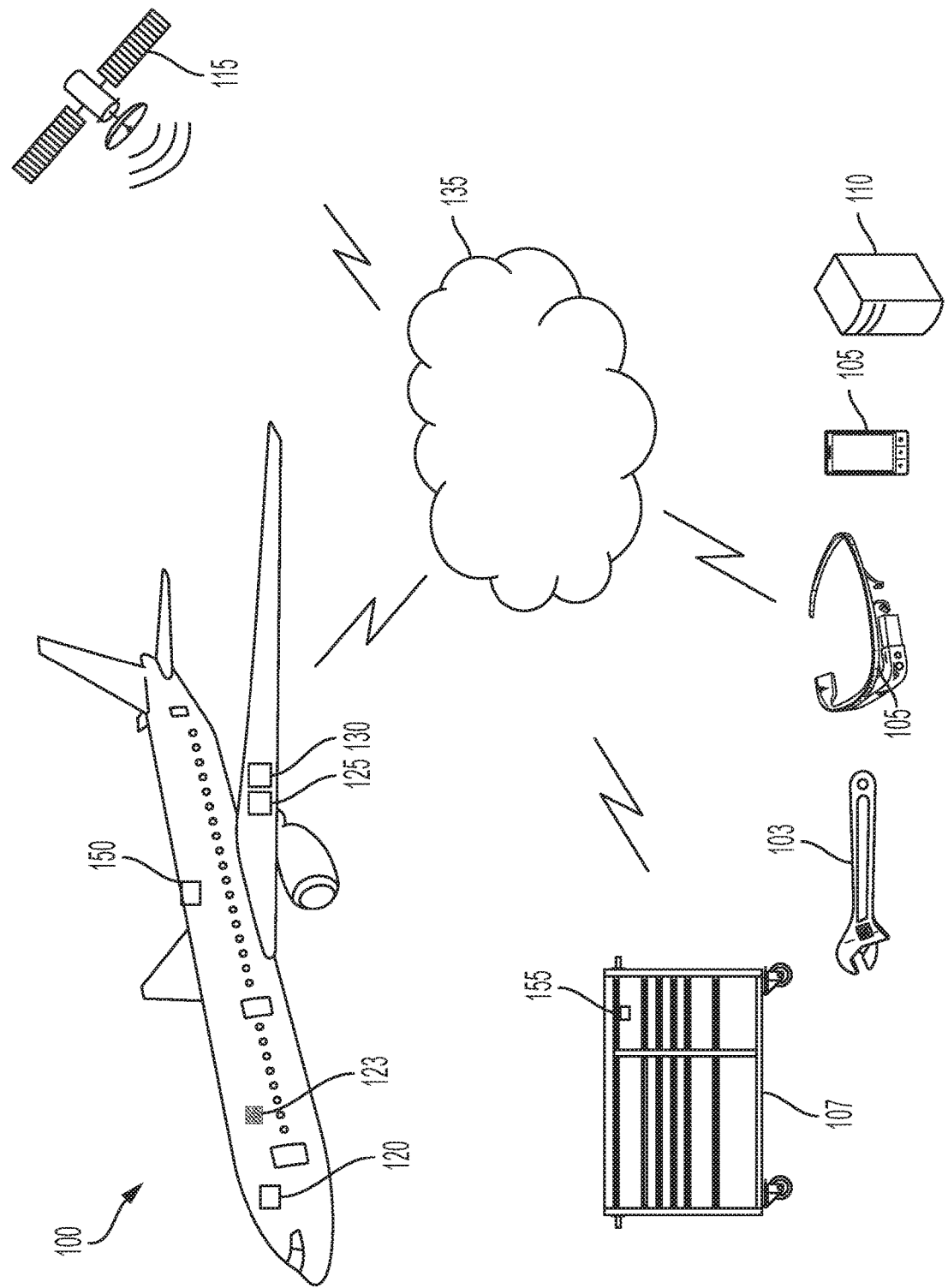
FIG. 1 is a diagram of a system that can be used to practice various embodiments of the present invention.

FIGS. 4, 6, 9, 11, 14, 15, 16, 18, 19, 20, 21, and 22 are flow charts illustrating various procedures and operations that may be completed in accordance with various embodiments of the present invention; and FIGS. 5, 7, 8, 10, 12, 13A, 13B, 17A, and 17B illustrate example views of the interactive AR/VR user interface, in accordance with various embodiments of the present invention.

DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast display mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more powered assets 100, one or more tools 103, one or more user computing entities 105, one or more non-powered assets 107, one or more management systems 110, one or more Global Positioning System (GPS) satellites 115, one or more location sensors 120, one or more telematics sensors 125, one or more information/data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, stand-alone entities, the various embodiments are not limited to this particular architecture.

a. Exemplary Powered Asset

In various embodiments, the term powered asset 100 is used generically. For example, a powered asset 100 may be a flatbed, an aircraft, an aircraft-pushback tractor, cargo loader, forklift, and/or the like. As will be recognized, each powered asset 100 may be associated with a unique powered asset identifier (such as a powered asset ID) that uniquely identifies the powered asset 100. The unique powered asset ID may include characters, such as numbers, letters, symbols, and/or the like. For example, an alphanumeric powered asset ID (e.g., "N123AB") may be associated with each powered asset 100. In another embodiment, the unique powered asset ID may be a registration number or other identifying information/data assigned to the powered asset 100. The powered asset ID can may be represented as text, barcodes, tags, character strings, Aztec Codes, MaxiCodes, information/data Matrices, Quick Response (QR) Codes, and/or the like and positioned as markers 123 in a machine readable/detectable manner on the powered asset 100. The marker 123 can be used to generate and display an augmented/mixed reality environment based on powered assets 100 and/or non-powered assets 107.

Figure 2:
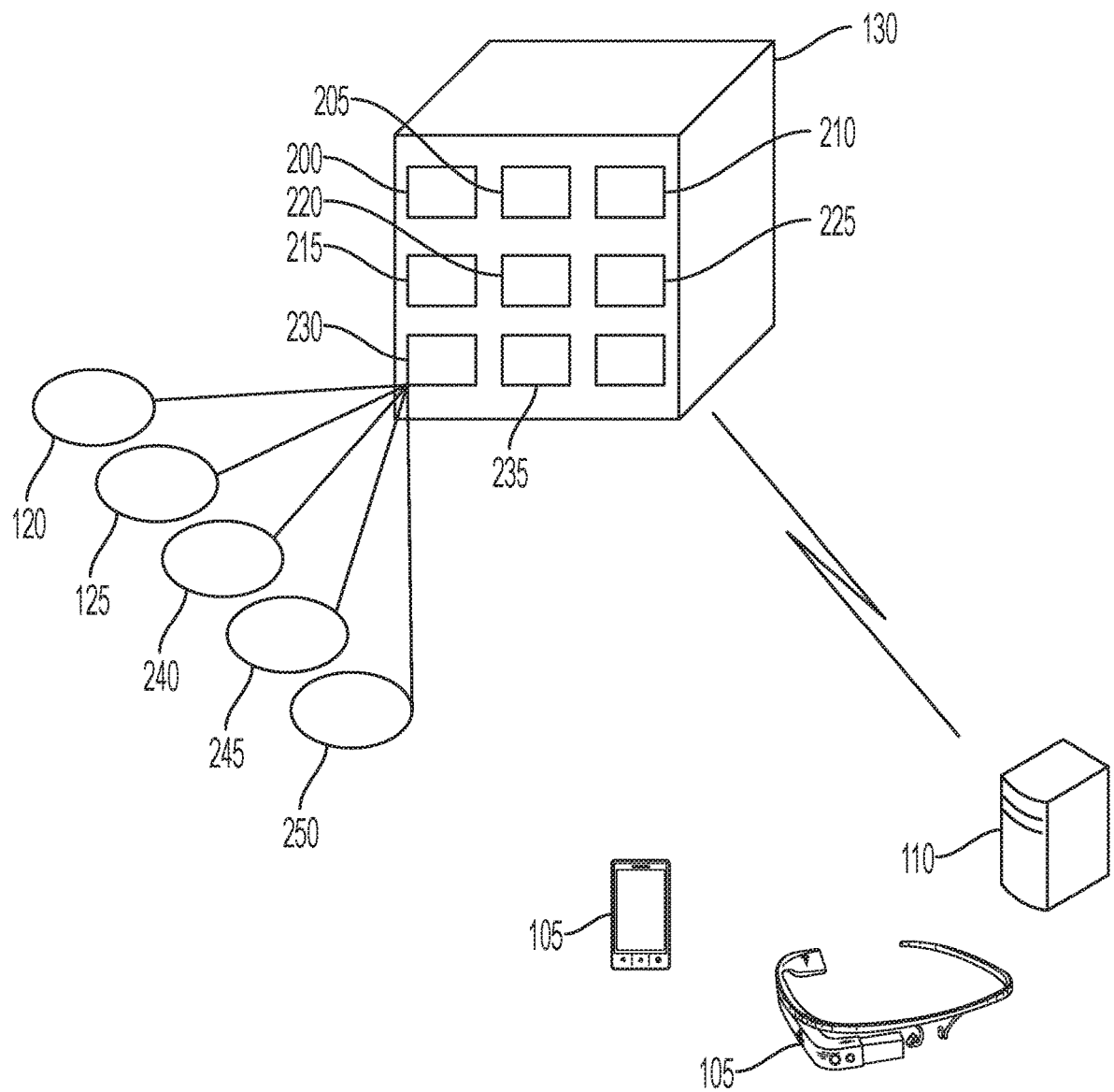
FIG. 2 is a diagram of an information/data collection device that may be used in association with certain embodiments of the present invention.

FIG. 1 shows one or more computing entities, devices, and/or similar words used herein interchangeably that are associated with the powered asset 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, watches, glasses, beacons, key fobs, radio frequency identification (RFID) tags, ear pieces, scanners, televisions, dongles, cameras, wristbands, wearable items/devices, items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a powered asset 100. The information/data collection device 130 may collect telematics information/data (including location data) and transmit/send the information/data to the user computing entity 105, the management system 110, and/or various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID/BLE tags/sensors 250, one or more power sources 220, one or more information/data radios 235 for communication with a variety of communication networks, one or more memory modules 210, and one or more programmable logic controllers (PLC) 225. It should be noted that many of these components may be located in the powered asset 100 but external to the information/data collection device 130. Thus, each of the components may be referred to individually or collectively as a powered asset computing entity.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, Global Navigation Satellite systems (GLONASS), the Chinese Compass navigation systems, Indian Regional Navigational satellite systems, and/or the like. Furthermore, the one or more location sensors 120 may be compatible with Assisted GPS (A-GPS) for quick time to first fix and jump starting the ability of the location sensors 120 to acquire location almanac and ephemeris data, and/or be compatible with Satellite Based Augmentation System (SBAS) such as Wide Area Augmentation System (WAAS), European Geostationary Navigation Overlay Service (EGNOS), and/or MTSAT Satellite Augmentation System (MSAS), GPS Aided GEO Augmented Navigation (GAGAN) to increase GPS accuracy. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular powered asset and/or the powered asset's operator and with various communication points (e.g., cellular towers or Wi-Fi access points) positioned at various locations throughout a geographic area to monitor the location of the powered asset 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the management system 110, the information/data collection device 130, user computing entity 105, and/or similar computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include powered asset sensors, such as engine, fuel, odometer, hubometer, tire pressure, location, weight, emissions, door, and speed sensors. The telematics information/ data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and/or digital inputs from powered asset systems and sensors. The ECM 245 may further have information/data processing capability to collect and present telematics information/data to the J-Bus (which may allow transmission to the information/data collection device 130), and output standard powered asset diagnostic codes when received from a powered asset's J-Bus-compatible on-board controllers 240 and/or sensors.

Additionally, each powered asset 100 may have a powered asset beacon/tag/sensor 150 attached or affixed thereto. As will be recognized, a beacon/tag/sensor may take many forms. For instance, a beacon/tag/sensor may be a BLE tag, a beacon (e.g., a URIBeacon, an AltBeacon, or an iBeacon), an RFID beacon/tag/sensor, an NFC device, a Wi-Fi device, and/or the like. The powered asset beacon 150 can include some or all of the following components: one or more input interfaces for receiving information/data, one or more output interfaces for transmitting information/data, a processor, a clock, memory modules, one or more sensors for sensing and detecting various information/data, location determining aspects (such as those described in relation to the user computing entity 105), and a power source. The power source may be a source provided by the powered asset, an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each powered asset beacon 150 can store one or more unique identifiers, such as a global unique identifier (GUID), a universally unique identifier (UUID), a character string, an alphanumeric string, text string, and/or the like. The unique identifier may identify the associated powered asset 100 and/or powered asset beacon. Via various communication standards and protocols, the powered asset beacon 150 associated with the powered asset 100 can be communicated with, interrogated, read, and/or the like. For example, a non-powered asset beacon 155 associated with a non-powered asset 107 or a tool 103 can communicate with the powered asset beacon 150 associated with the powered asset 100 using multiple wireless communication standards and protocols, including Bluetooth, Wibree, NFC, Wi-Fi, ZigBee, and/or any other wireless protocol or standard. The powered asset beacon 150 associated with the powered asset 100 may also be in direct or indirect communication with the management system 110, the information/data collection device 130, user computing entity 105, and/or similar computing entities over the same or different wired or wireless networks.

As will be recognized, a powered asset beacon 150 can be used to sense and/or detect various information/data—including powered assets 100 and/or non-powered assets 107 within its proximity. Additionally, a powered asset beacon 150 can be capable of sensing/collecting/determining temperature information/data, location information/data (such as described above and below), pressure information/data, altitude information/data, vacuum information/data, vibration information/data, shock information/data, humidity information/data, moisture information/data, light information/data, air information/data, and/or the like. In one embodiment, a powered asset beacon 150 may be operated in one or more operating modes, such as advertising/broadcasting mode, listening mode, sleep mode, and/or the like. In advertising/broadcasting mode, the powered asset beacon 150 may transmit an advertising signal regularly, periodically (e.g., 10 times/second), and/or continuously. The advertising signal may include one or more unique identifiers (e.g., powered asset information and/or unique powered asset beacon identifier), received signal strength indicator (RSSI) information/data, and/or other information/data. In listening mode, the powered asset beacon 150 is capable of receiving signals transmitted by other beacons and/or other computing entities. In sleep mode, the powered asset beacon 150 may cut power to unneeded subsystems and place the other subsystems (e.g., receiver, processor) into a configurable low power state (e.g., with just sufficient power for the powered asset beacon 150 to detect triggers/events for it to change/switch from sleep mode into other operational modes (e.g., listening mode, advertising mode)). The change of the operational mode may be triggered by various configurable triggers/events, such as pressure, altitude, motion, location, light, sound, time, signal transmitted from another beacon and/or an appropriate computing entity, a switch, an interactive feature, combinations thereof, and/or the like.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the powered asset 100 in which the information/data collection device 130 is installed, specific to the geographic area in which the powered asset 100 will be traveling, specific to the function the powered asset 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols (including Bluetooth Low Energy (BLE)), ZigBee, wireless universal serial bus (USB) protocols, and/or any other wireless protocol.

Although the preceding was described in the context of a powered assets 100, the same concepts can apply to other contexts and facilities, such as warehouses, buildings, storage facilities, shipping yards, and/or the like. In such embodiments, the facilities may include one or more components described above, including beacons affixed to various locations throughout the facilities. As will be recognized, a variety of other approaches and techniques can be used to adapt to various needs and circumstances.

b. Non-Powered Assets

In one embodiment, a non-powered asset 107 may be used to store one or more tools 103 (e.g., shipments, packages, pallets, etc.), repair or inspection parts, and/or cargo of varying shapes and sizes. In one embodiment, a tool 103 may be displayed in an augmented or virtual display as part of a repair or inspection process.

In one embodiment, each non-powered asset 107 and/or tool 103 may include and/or be associated with a unique tracking identifier, such as an alphanumeric identifier or machine readable identifier. Such tracking identifiers may be represented as text, barcodes, tags, character strings, Aztec Codes, MaxiCodes, information/data Matrices, QR Codes, electronic representations, and/or the like. A unique tracking identifier (e.g., 1Z5600100300083767) may be used to identify and track non-powered assets 107 and tools 103. For example, information/data comprising a tracking identifier can be read, scanned, transmitted, advertised, and/or the like to provide and/or identify/determine the location of a non-powered asset 107 and/or tool 103. As will be recognized, tools 103 can be associated with a non-powered asset 107 and therefore associated tools 103 can be considered to be located in the non-powered asset 107 at the determined location of the non-powered asset 107. These can be referred to as "logical" scans/determinations or "virtual" scans/determinations.

Such tracking identifiers can be affixed to items by, for example, using a sticker (e.g., label) with the unique tracking identifier printed thereon (in human-readable form and/or machine-readable form). In other embodiments, a non-powered asset beacon/tag/sensor 155 or an RFID/BLE beacon/tag/sensor may be affixed to or associated with each non-powered asset 107 and/or tool 103 and store a unique tracking identifier. As previously noted, a beacon/tag/sensor may take many forms. For example, a beacon/tag/sensor may be a BLE tag, a beacon (e.g., a URIBeacon, an AltBeacon, or an iBeacon), an RFID beacon/tag/sensor, a BLE beacon/tag/sensor, an NFC device, a Wi-Fi device, and/or the like. The non-powered asset beacon 155 can include some or all of the following components: one or more input interfaces for receiving information/data, one or more output interfaces for transmitting information/data, a processor, a clock, memory modules, one or more sensors for sensing and detecting various information/data, and a power source. The power source may be an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each non-powered asset beacon 155 can store one or more unique identifiers, such as a tracking identifier for the corresponding tool 103. The unique identifier may identify the associated non-powered asset 107 (and/or tool 103) and/or non-powered asset beacon 155. Via various communication standards and protocols, the non-powered asset beacon 155 associated with the non-powered asset 107 and/or tool 103 can be communicated with, interrogated, read, and/or the like. For example, the non-powered asset beacon 155 associated with the non-powered asset 107 and/or tool 103 can communicate with a powered asset beacon 150 associated with a powered asset 100 using multiple wireless communication standards and protocols, including Bluetooth, Wibree, NFC, Wi-Fi, ZigBee, and/or any other wireless protocol or standard. The non-powered asset beacon 155 associated with the non-powered asset 107 may also be in direct or indirect communication with a management system 110, an information/data collection device 130, a user computing entity 105, and/or similar computing entities over the same or different wired or wireless networks.

As will be recognized, a non-powered asset beacon 155 can be used to store (e.g., item information/data, sense, detect, and collect various information/data. For example, a non-powered asset beacon 155 can be capable of sensing/collecting/determining temperature information/data, pressure information/data, altitude information/data, vacuum information/data, vibration information/data, shock information/data, humidity information/data, location information/data (such as described above and below), moisture information/data, light information/data, air information/data, and/or the like. In one embodiment, a non-powered asset beacon 155 may be operated in one or more operating modes, such as advertising mode, listening mode, sleep mode, and/or the like. In advertising mode, the non-powered asset beacon 155 may transmit an advertising signal regularly, periodically (e.g., 10 times/second), and/or continuously. The advertising signal may include one or more unique identifiers (e.g., unique container identifier and/or unique non-powered asset beacon identifier), RSSI information/data, and/or other information/data. In listening mode, the non-powered asset beacon 155 is capable of receiving signals transmitted by other beacons, and/or an appropriate computing entities. In sleep mode, the non-powered asset beacon 155 may cut power to unneeded subsystems and place the other subsystems (e.g., receiver, processor) into a configurable low power state (e.g., with just sufficient power for the non-powered asset beacon 155 to detect triggers/events for it to change/switch from sleep mode into other operational modes (e.g., listening mode, advertising mode)). The change of the operational mode may be triggered by various configurable triggers/events, such as pressure, altitude, motion, light, location, sound, time, signal transmitted from another beacon and/or an appropriate computing entity, a switch, an interactive feature, combinations thereof, and/or the like.

c. Exemplary Management System

Figure 3A:
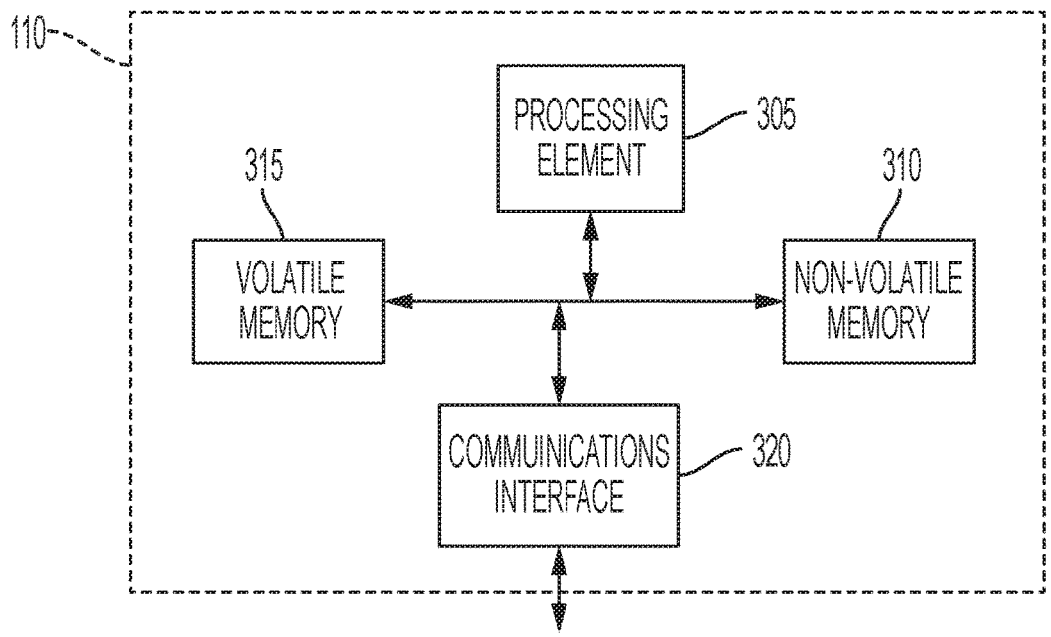
FIG. 3A is a schematic of a management system in accordance with certain embodiments of the present invention.

FIG. 3A provides a schematic of a management system 110 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, servers or server networks, blades, gateways, switches, processing devices, processing entities, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management system 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the management system 110 may communicate with powered assets 100, user computing entities 105, and/or the like.

As shown in FIG. 3A, in one embodiment, the management system 110 may include or be in communication with one or more processing elements 305 (also referred to as processors, processing circuitry, and/or similar terms used herein interchangeably) that communicate with other elements within the management system 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the management system 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the management system 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the management system 110 with the assistance of the processing element 305 and operating system.

As indicated, in one embodiment, the management system 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the management system 110 may communicate with computing entities or communications interfaces of the powered asset 100, user computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the management system 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, Zigbee, Wibree, and/or any other wireless protocol. Although not shown, the management system 110 may include or be in communication with one or more input elements, such as a keyboard input, a mouse input, motion/gesture/movement input, virtual input, a touch screen/display input, audio input, pointing device input, joystick input, keypad input, and/or the like. The management system 110 may also include or be in communication with one or more output elements (not shown), such as audio output, video output, screen/display output, motion output, movement output, and/or the like.

As will be appreciated, one or more of the management system's 110 components may be located remotely from other management system 110 components, such as in a distributed system. Furthermore, one or more of the components may be combined and additional components performing functions described herein may be included in the management system 110. Thus, the management system 110 can be adapted to accommodate a variety of needs and circumstances.

d. Exemplary User Computing Entity

Figure 3B:
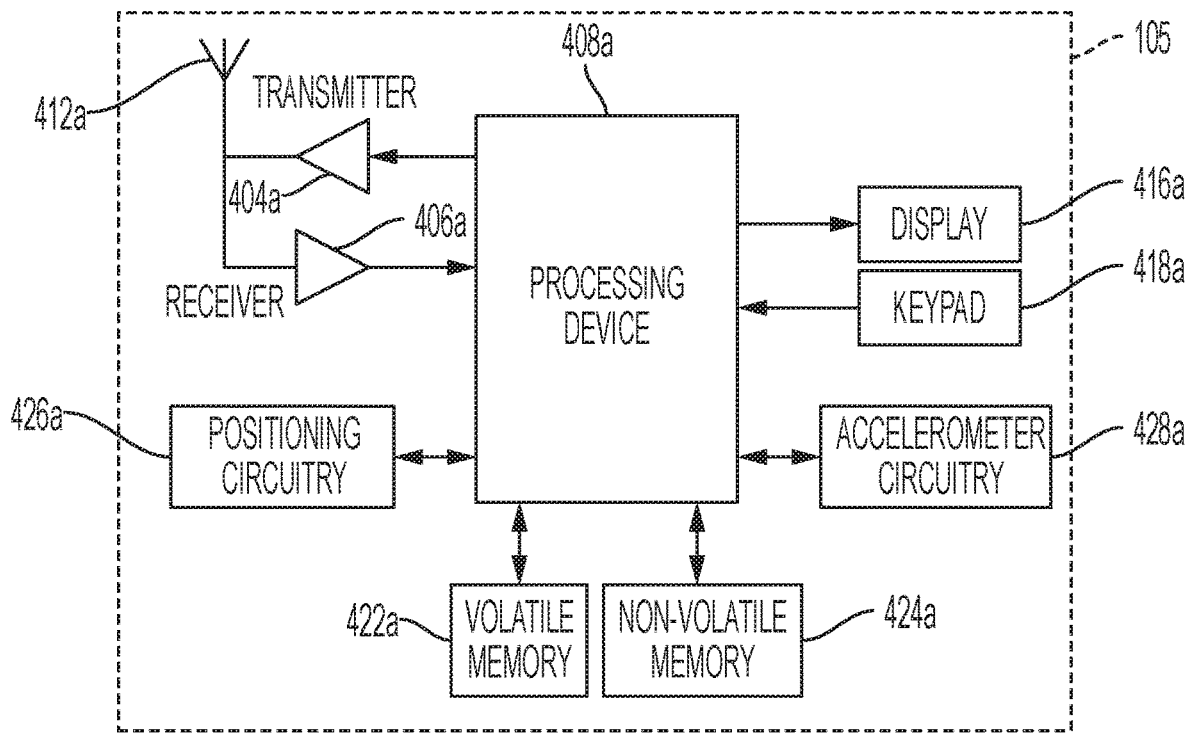
FIG. 3B is a schematic of a user computing entity in accordance with certain embodiments of the present invention.

FIG. 3B provides an illustrative schematic representative of a user computing entity 105 that can be used in conjunction with embodiments of the present invention. In one embodiment, the user computing entity 105 may be one or more mobile phones, tablets, watches, glasses (e.g., Google Glass®, Vuzix M-100, SeeThru, Optinvent ORA-S, and the like), wristbands, wearable items/devices, head-mounted displays (HMDs) (e.g., Oculus Rift, Sony HMZ-T3W, and the like), the like, and/or any combination of devices or entities adapted to perform the functions, operations, and/or processes described herein. The term user computing entity 105 is intended to refer to any device that projects, superimposes, overlays, or otherwise provides an image on a surface with respect to a user's viewing angle or line of vision or a user computing entity's angle. The term user computing entity 105 is intended to also include any other peripheral electronics and functionality that may be provided in conjunction with such devices. For example, a user computing entity 105 may include speakers, headphones, or other electronic hardware for audio output, a plurality of display devices (e.g., the use of two display devices, one associated with each of the user's eyes, to enable a stereoscopic, two-dimensional (2D) viewing environment, three-dimensional (3D) viewing environment), one or more position sensors (e.g., gyroscopes, global positioning system receivers, and/or accelerometers), beacons for external sensors (e.g., infrared lamps), or the like. In one embodiment, the user computing entity can be used to provide an augmented reality environment/area, environment/area mixed reality environment/area, and/or similar words used herein interchangeably to a user. The terms augmented/mixed reality environment/area should be understood to refer to a combined environment/area including the physical environment/area and elements of a virtual environment/area.

In one embodiment, a user computing entity may be used by various personnel (e.g., users) and provide the personnel with an augmented/mixed reality environment. In one embodiment, the user computing entities 105 may include one or more components that are functionally similar to those of the management system 110 described above. Accordingly, the user computing entity 105 may be eyewear, such as Google Glass®, configured to capture audio and visual data during a time the entity 105 is being worn by a user. Here, the entity 105 may be worn in such a way that it is supported by the head of the user, leaving the user's hands free to perform instructions supplied to the user. In other instances, the user computing entity 105 may be some type of handheld device, such as a smartphone or tablet, with an application installed on the device to enable it to operate in an augmented reality environment.

In general, the user computing entity 105 includes a digital display that can be positioned in the user's field of view. For example, the digital display may be implemented within or on the lens of the entity 105 as eyewear having a see-through field-of-view. While in another example, the digital display may be implemented on the touch screen of a handheld device 110 that the party holds up in his or her field of vision that is visible through a camera lens. The digital display of the entity 105 may view and control items shown on the display. That is to say, the digital display may be an augmented reality display that projects media over real world, physical objects. For example, the user wearing the entity 105 as eyewear may be capable of seeing the digital display overlaying the real world visible to the user through the lens.

As shown in FIG. 3B, a user computing entity 105 can include an antenna 412a, a transmitter 404a (e.g., radio), a receiver 406a (e.g., radio), and a processing element 408a that provides signals to and receives signals from the transmitter 404a and receiver 406a, respectively. The signals provided to and received from the transmitter 404a and the receiver 406a, respectively, may include signaling information/data in accordance with an air interface standard of applicable wireless systems to communicate with various entities, such as powered assets 100, management systems 110, and/or the like. In this regard, the user computing entity 105 may be capable of operating with one or more air interface standards, communication protocols, modulation types, and access types. More particularly, the user computing entity 105 may operate in accordance with any of a number of wireless communication standards and protocols. In a particular embodiment, the user computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, USB protocols, Bluetooth protocols, Wibree protocols, NFC protocols, Wi-Fi protocols, ZigBee protocols, and/or any other wireless protocol or standard.

Via these communication standards and protocols, the user computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

According to one embodiment, the user computing entity 105 may include location determining aspects, devices, modules, functionalities, and/or similar words used herein interchangeably—positioning circuitry 426a. For example, the user computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, GLONASS, the Chinese Compass navigation systems, Indian Regional Navigational satellite systems, and/or the like. Additionally, the location module may be compatible with A-GPS for quick time to first fix and jump starting the ability of the location module to acquire location almanac and ephemeris data, and/or be compatible with SBAS such as WAAS, EGNOS, MSAS, and/or GAGN to increase GPS accuracy. Alternatively, the location information/data may be determined by triangulating the user computing entity's 105 position in connection with a variety of other systems, including cellular towers, Wi-Fi access points, and/or the like. Similarly, the user computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID/BLE tags, indoor beacons or transmitters, Wi-Fi access points, cellular towers, nearby computing devices (e.g., smartphones, laptops) and/or the like. For instance, such technologies may include iBeacons, Gimbal proximity beacons, BLE receivers and/or transmitters, NFC receivers and/or transmitters, and/or the like. These positioning aspects can be used in a variety of settings to determine the location of someone or something to within inches or centimeters.

The user computing entity 105 may also detect markers 123 and/or target objects. For example, the user computing entity 105 may include readers, scanners, cameras, sensors, and/or the like for detecting when a marker 123 and/or target object is within its point-of-view (POV)/field-of-view (FOV) of the real-world environment/area. For example, readers, scanners, cameras, sensors, and/or the like may include RFID readers/interrogators to read RFID tags, scanners and cameras to capture visual codes (e.g., text, barcodes, character strings, Aztec Codes, MaxiCodes, information/data Matrices, QR Codes, electronic representations, and/or the like), and sensors to detect beacon signals transmitted from target objects or the environment/area in which target objects are located.

In one embodiment, the user computing entity 105 may include accelerometer circuitry 428a for detecting movement, pitch, bearing, orientation, and the like of the user computing entity 105. This information/data may be used to determine which area of the augmented/mixed reality environment/area corresponds to the orientation/bearing of the user computing entity 105 (e.g., x, y, and z axes), so that the corresponding environment/area of the augmented/mixed reality environment/area may be displayed via the display 416a along with a displayed image. For example, the user computing entity 105 may overlay an image in a portion of the user's POV/FOV of the real-world environment/area.

The user computing entity 105 may include a camera (not shown) to capture visual data (e.g., images and/or video) of the environment/area of the user computing entity 105 from a particular POV/FOV. That is, a camera configured to capture visual data from the vantage point seen by the user. The POV/FOV of the camera may correspond to the direction of the user computing entity 105 and therefore the POV/FOV of the user. With the POV/FOV, images can be presented to the user of target objects that are within the environment/area of the user computing entity 105. For example, while personnel are going about their daily work, the user computing entity 105 can display the corresponding environment/area and images overlaid on the same. The displayed image may include images text (instructions for repair), video (e.g., videos showing a repair), menus, selection boxes, navigation icons, and/or the like.

The user computing entity 105 may also comprise an AR/VR user interface (that can include a display 416a coupled to a processing element 408a) and/or a user input interface (coupled to a processing element 408a). For example, the user input interface can comprise any of a number of devices allowing the user computing entity 105 to receive data, such as a keypad 418a (hard or soft), a touch display, voice/speech or motion interfaces, scanners, readers, or other input device. The entity 105 may also include a speaker and/or a microphone to communication audio to and/or capture audio from the user. The speaker may provide instructions to the user in the form of audio. While the microphone may capture speech from the user, ambient (environmental) sounds, and the like. In embodiments including a keypad 418a, the keypad 418a can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity can collect contextual information/data as part of the telematics data.

Accordingly, the user input interface may include one or more input elements as described above configured to provide control signals triggered by input from the user. For instance, one input element may be a touch pad configured to detect motions from a finger in contact with the pad that interprets the motions as control signals from the user. For example, the user may select a desired component and/or topic from a list displayed on the AR/VR user interface by swiping his or her finger down on the touch pad to scroll through the components and/or topics on the list and tapping on the touch pad to select the desired component and/or item.

In another instance, an input element may be voice commands provided by the user speaking into the microphone of the entity 105. For example, the entity may say "take photo" that indicates to the entity 105 to capture an image of the current view of the user. Those skilled in the art may appreciate other input elements that may be utilized for controlling the user computing entity 105, such as a gesture command, compass, light sensor, location/GPS sensor, gyroscope, a tactile button, and/or the like.

The user computing entity 105 can also include volatile storage or memory 422a and/or non-volatile storage or memory 424a, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 105.

In various embodiments, the user computing entity 105 is configured to transmit and received information to and from another entity such as the management system 110 in a live, real-time manner. For instance, in particular embodiments, audio and visual information/data is streamed between the entity 105 and the management system 110. Here, the audio information/data may comprise any suitable recording, artificial voice, etc. and the visual/data information may comprise any suitable text, image, photo, video, animation, graphic, etc. For example, the management system 110 may interact with the user by streaming information/data to the entity 105 that is displayed in the field-of-view (e.g. at least a portion of a line of vision) of the user. Thus, the user computing device 105 and management system 110 may be in communication with one another over some type of network, such as a wireless network.

III. Exemplary System Operation

As described above, the management system 110 and/or user computing entity 105 may be configured for storing technical data associated with an item, providing technical data associated with an item to a user, providing tools for a user accessing technical data associated with an item and/or aiding in user access of technical data associated with an item. In various embodiments, the technical data associated with the item may be stored and/or provided in accordance with S1000D standards and/or a variety of other standards. According to various embodiments, the management system 110 and/or user computing entity 105 provides and/or aids in the access of technical data in accordance with user instructions and/or input received via the management system 110 and/or user computing entity 105 (e.g., via an AR/VR user interface). In various embodiments, an AR/VR user interface (e.g., for 2D or 3D visualization). The AR/VR user interface may be accessible from a user computing entity 105 (e.g., in communication with the management system 110 via the network 135). For example, in various embodiments, a user may log in to the management system 110 from a user computing entity 105 (e.g., by opening a log-in display and entering a user ID and password). The management system 110 may be configured to recognize any such log-in request, verify that user has permission to access the system (e.g., by confirming the user ID and password are valid), and present/provide the user with an AR/VR user interface (e.g., displayed on display 416a). In other embodiments, user log-in is not required to access the AR/VR user interface. Reference will now be made to FIGS. 4-19.

Figure 4:
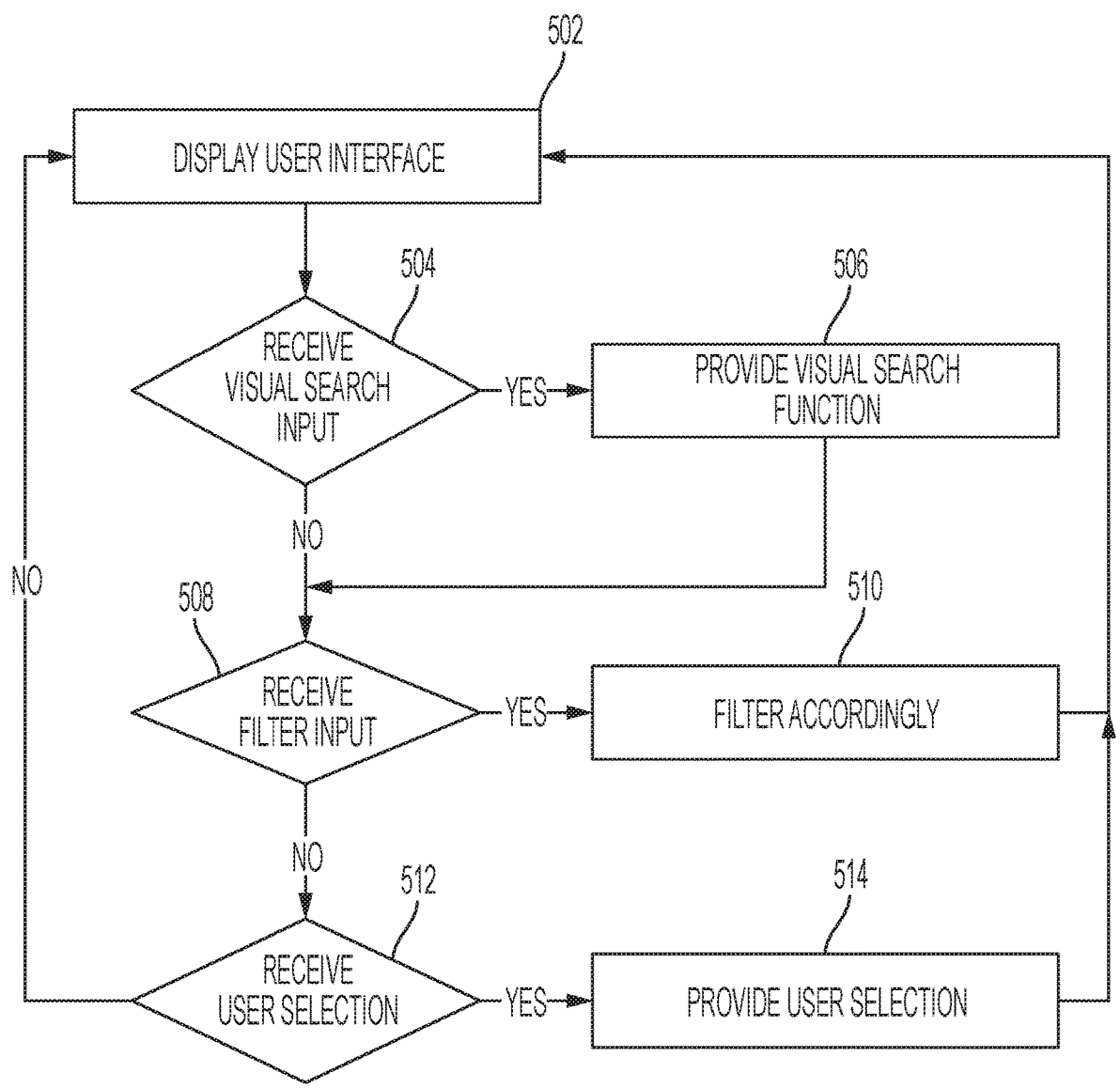
Figure 5:
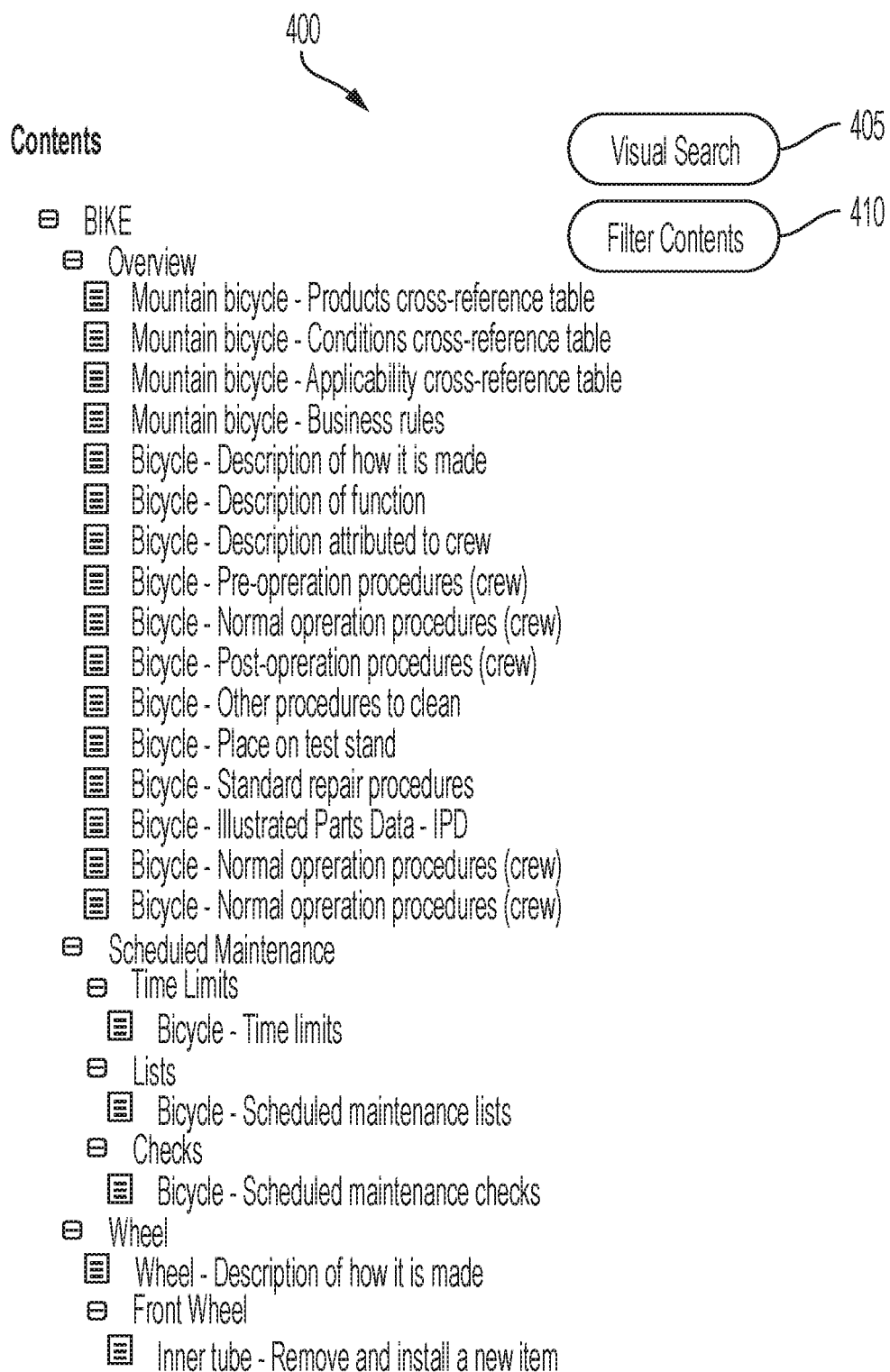

FIG. 4 is a flowchart providing a summary overview of some of the steps, operations, and procedures that may be completed in accordance with various embodiments. At step/operation 502, the AR/VR user interface can be provided. For example, the AR/VR user interface may be displayed via a user computing entity 105. In various embodiments, the AR/VR user interface may be provided for augmented or virtual displays (e.g., for 2D or 3D visualization). FIG. 5 illustrates an exemplary AR/VR user interface 400 that may be provided to a user (e.g., operating a user computing entity 105). The AR/VR user interface 400 may comprise a table of contents for the technical data associated with the item, an interactive search feature 405, and a filter contents interactive feature 410.

At step/operation 504, it is determined if input indicating the user would like to access the interactive search feature has been received. For example, a user may select the interactive search feature 405 and, after the user selects the interactive search feature, or possibly in response thereto, the management system 110 and/or user computing entity 105 may receive the input indicating the user would like to access the interactive search feature. At step/operation 506, the interactive search feature can be provided to the user, as described in more detail below.

At step/operation 508, it is determined if input indicating the user would like to filter the technical data associated with the item has been received. For example, the management system 110 and/or the user computing entity 105 may receive input indicating the user would like to filter the technical data associated with the item. For example, a user may select the filter contents interactive feature 410. The user may provide one or more filter criteria for filtering (e.g., via the AR/VR user interface operating on the user computing entity 105), as described in more detail elsewhere herein. At step/operation 510, the one or more filter criterion are used to filter the provided information/data displayed via the AR/VR user interface.

At step/operation 512, it is determined if input indicating user selection/identification of a topic has been received. For example, the management system 110 and/or the user computing entity 105 may receive input indicating user selection/identification of a topic. For example, each topic may be associated with at least one data module and may correspond to a component (e.g., assembly, sub-assembly, sub-sub-assembly, system, subsystem, sub-subsystem, part, and/or the like) of the item, a task (e.g., for repairing or inspecting a powered asset 100) or maintenance associated with the item or a component of the item, and/or the like. At step/operation 514, the selected topic can be provided to the user via the AR/VR user interface (e.g., via an augmented or virtual interface of the user computing entity 105). The interactive search feature, filtering functions, and various other functions provided by various embodiments of the present invention will now be described in detail.

a. Interactive Search Feature

Figure 6:
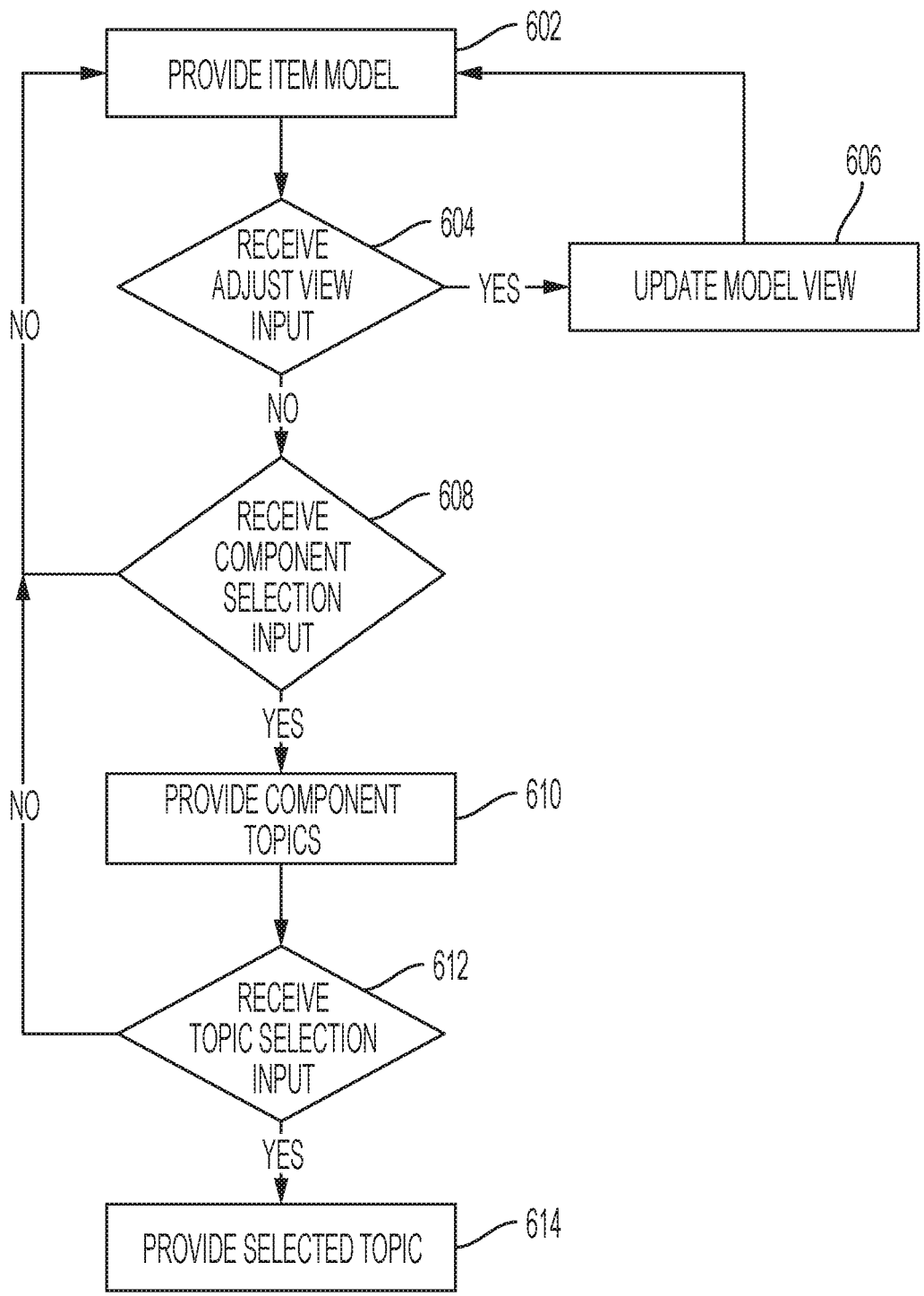
Figure 7:
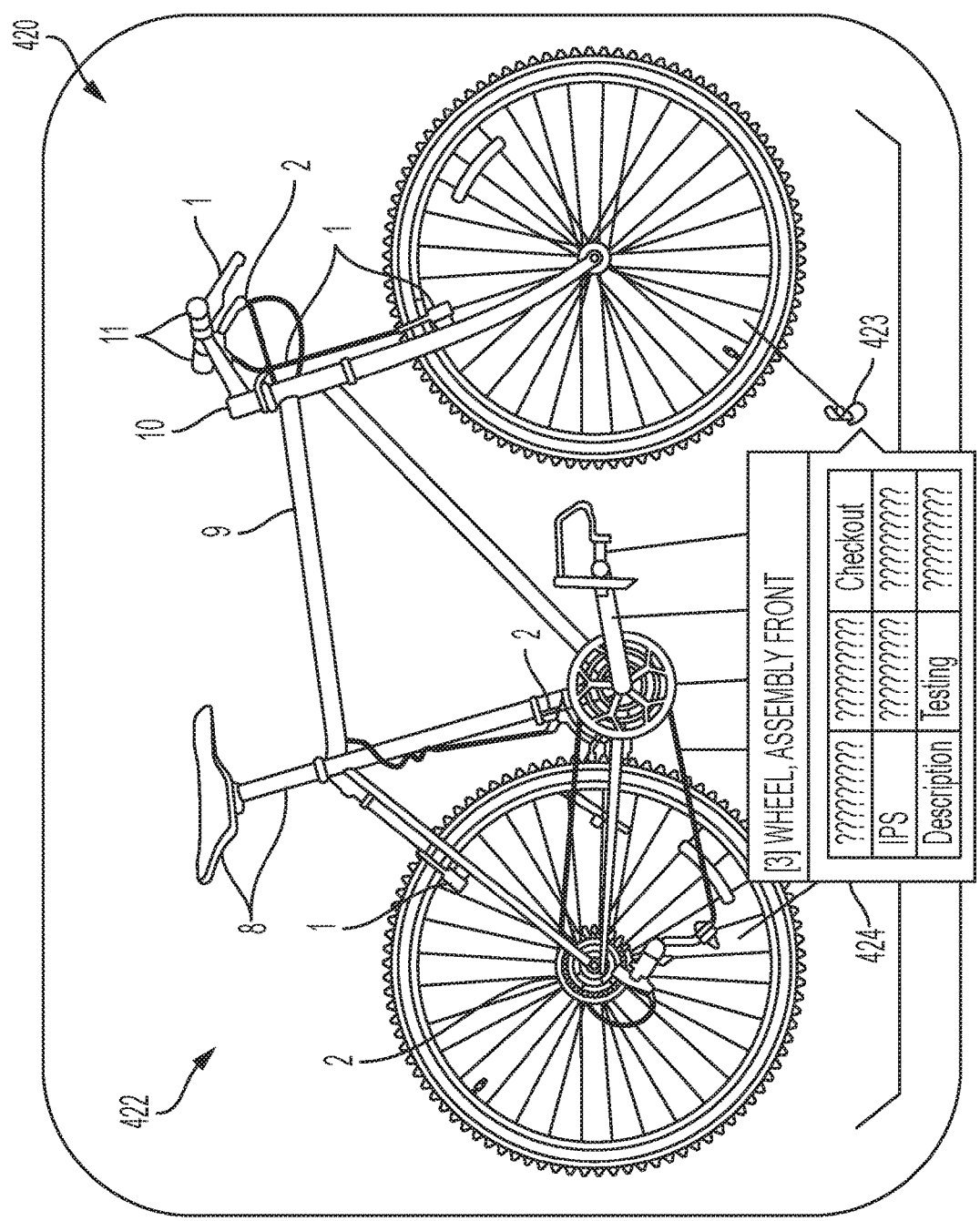

After receiving the input indicating the user would like to access the interactive search feature (e.g., at step/operation 504), or possibly in response thereto, a model of the item can be provided, as shown in step/operation 602 of FIG. 6. For example, the management system 110 and/or user computing entity 105 may provide the 2D or 3D model and/or cause the 2D or 3D model to be displayed to the user (e.g., via an AR/VR user interface of the user computing entity 105). The 2D or 3D model may comprise one or more 2D or 3D visual representations. The 2D or 3D model or 2D or 3D visual representation may be a digital image in any of a variety of formats, such as JPEG, JFIF, JPEG2000, EXIF, TIFF, RAW, DIV, GIF, BMP, PNG, PPM, and/or the like. The 2D or 3D model or 2D or 3D visual representation may be a document in any of a variety of formats, such as DOCX, HTML5, TXT, PDF, and/or the like. The 2D or 3D model or 2D or 3D visual representation may be a video in any of a variety of formats, such as MOV, AVI, MP4, MKV, and/or the like. Each 2D or 3D model or 2D or 3D visual representation may be configured to represent one or more components of the item. For example, various 2D or 3D visual representations may be configured to represent assemblies, sub-assemblies, sub-sub-assemblies, systems, subsystems, sub-subsystems, individual parts, and/or the like associated with the item. FIG. 7 illustrates an exemplary model 420 wherein the item is a bicycle. Component callouts 422 indicate the 2D or 3D visual representations comprising the model 420 and provide information as to which components the component callouts represent. For example, the selected callout 423 indicates that the indicated 2D or 3D visual representation represents the front wheel assembly, as shown by the component topics window 424. In various embodiments, a topic may comprise data/information associated with a component, instructions for performing a task (e.g., for repairing or inspecting a powered asset 100) relevant to a component, data/information associated with the item, instructions for performing a task (e.g., for repairing or inspecting a powered asset 100) associated with the item or a component thereof (e.g., repair, maintenance, modification and/or the like tasks), AR/VR interactive features to other relevant topics or references, and/or the like.

Figure 8:
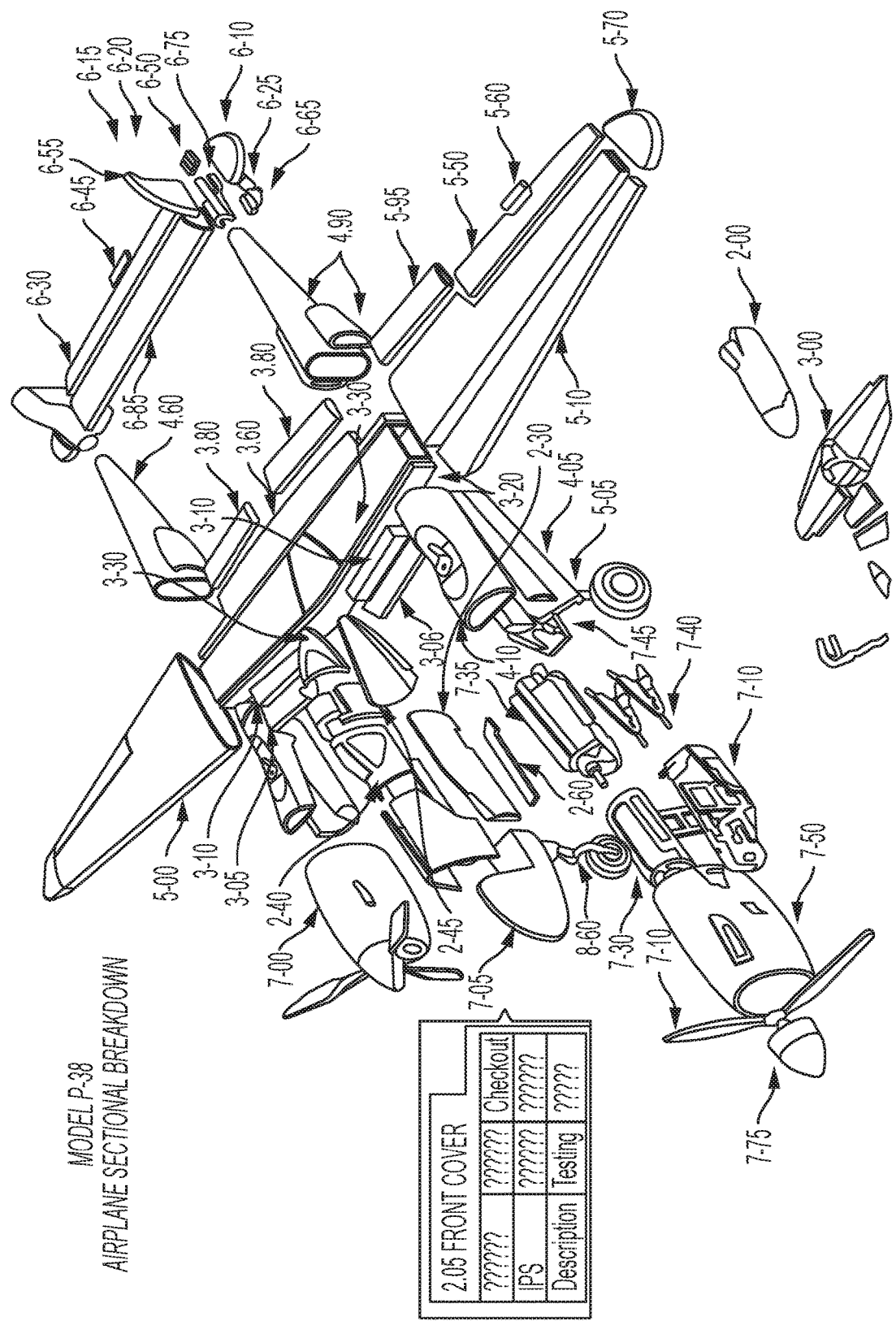

In various embodiments, the 2D or 3D model may be provided as an AR/VR exploded view, top view, side view, bottom view, front view, back view, cross-sectional view, or partial view of the item. In various embodiments, the 2D or 3D model may be provided in other views, as appropriate for the application. In various embodiments, the 2D or 3D model may be provided as a two-dimensional view of the item or as a three-dimensional view which, in some embodiments, may be manipulated to provide various views. In various embodiments, the AR/VR user interface may provide model view adjustment options. For example, a user may motion/gesture/move to request to change the view of the 2D or 3D model (e.g., an AR/VR side view may be provided and the user may motion/gesture/move to request an AR/VR top view), rotate the 2D or 3D model, zoom in and/or out, and/or the like. FIGS. 7 and 8 provide examples of models wherein FIG. 7 is a two-dimensional model of a bicycle provided as an AR/VR side view and FIG. 8 is a three-dimensional model of an aircraft provided as an exploded view. At step/operation 604, as shown in FIG. 6, it is determined if view adjustment input has been received. If, at step/operation 604, it is determined that view adjustment input has been received, then (e.g., in response thereto) the view adjustment is made and the updated 2D or 3D model can be provided at step/operation 606. For example, the management system 110 and/or user computing entity 105 may adjust the view as requested and provide the updated 2D or 3D model to the user (e.g., via an AR/VR user interface of the user computing entity 105).

If, at step/operation 604, it is determined that view adjustment input has not been received, then at step/operation 608 it is determined if input indicating user selection/identification of a component has been received. For example, a user (e.g., operating a user computing entity 105) may use a motion/gesture/movement to select or hover over a component or component callout 422 or use a voice input to select a component or component callout 422, such that input may be received by the management system 110 and/or user computing entity 105. After receiving input indicating user selection/identification of a component, or in response thereto, a list of topics (e.g., a list of AR/VR interactive features to topics) associated with the selected component are provided at step/operation 610. For example, the management system 110 and/or the user computing entity 105 may provide a list of topics associated with the selected component to the user (e.g., via the AR/VR user interface). For example, a component topics window 424 may be displayed (e.g., via the AR/VR user interface) listing topics associated with the component indicated by the selected callout 423. In various embodiments, the component topics window 424 may be a tool tip, dialog box, tear-off window, and/or the like.

In the exemplary AR/VR user interface illustrated in FIG. 7, the selected callout 423 is the component callout corresponding to the front wheel assembly of the bicycle. Component topics window 424 provides a list of topics related to the front wheel assembly of the bicycle. For example, the component topics window 424 lists topics such as removal of the front wheel assembly, an illustrated parts breakdown (IPB) of the front wheel assembly, a description of the front wheel assembly, installation of the front wheel assembly, troubleshooting the front wheel assembly, and other topics associated with the front wheel assembly. For other items, AR/VR interactive features to other topics may be available via the component topics window 424 such as wiring information/data, testing information/data, sub-systems or sub-assemblies of the selected component, regular maintenance information/data, and/or the like as appropriate for the item and selected component.

Returning to FIG. 6, at step/operation 612 it is determined if input selecting a topic from the list of topics has been received. For example, a user (e.g., operating a user computing entity 105) may select a topic from the component topics window 424. The management system 110 and/or the user computing entity 105 may receive input indicating the user's selection of a topic. After the input selecting the topic is received, or in response thereto, the selected topic can be provided, at step/operation 614. For example, if the list of topics can be provided as a list of AR/VR interactive features to each topic, the selected AR/VR interactive feature (e.g., the AR/VR interactive feature corresponding to the selected topic) may be followed to the data module associated with the selected topic. For example, the management system 110 and/or user computing entity 105 may provide the selected topic by accessing the data module associated with the selected topic. For example, if the user (e.g., operating a user computing entity 105) selected the topic "removal" associated with the front wheel assembly, the corresponding data module will be accessed and information/data associated with removal of the front wheel assembly can be provided to the user (e.g., via the AR/VR user interface operating on and/or displayed via the user computing entity 105). As will be recognized, a variety of approaches and techniques can be used to provide a gesture/visual/motion search and/or table of contents configured to allow a user to access information associated with an item without querying the information based on technical terminology related to the item.

b. AR/VR Interactive Feature Preview

Figure 9:
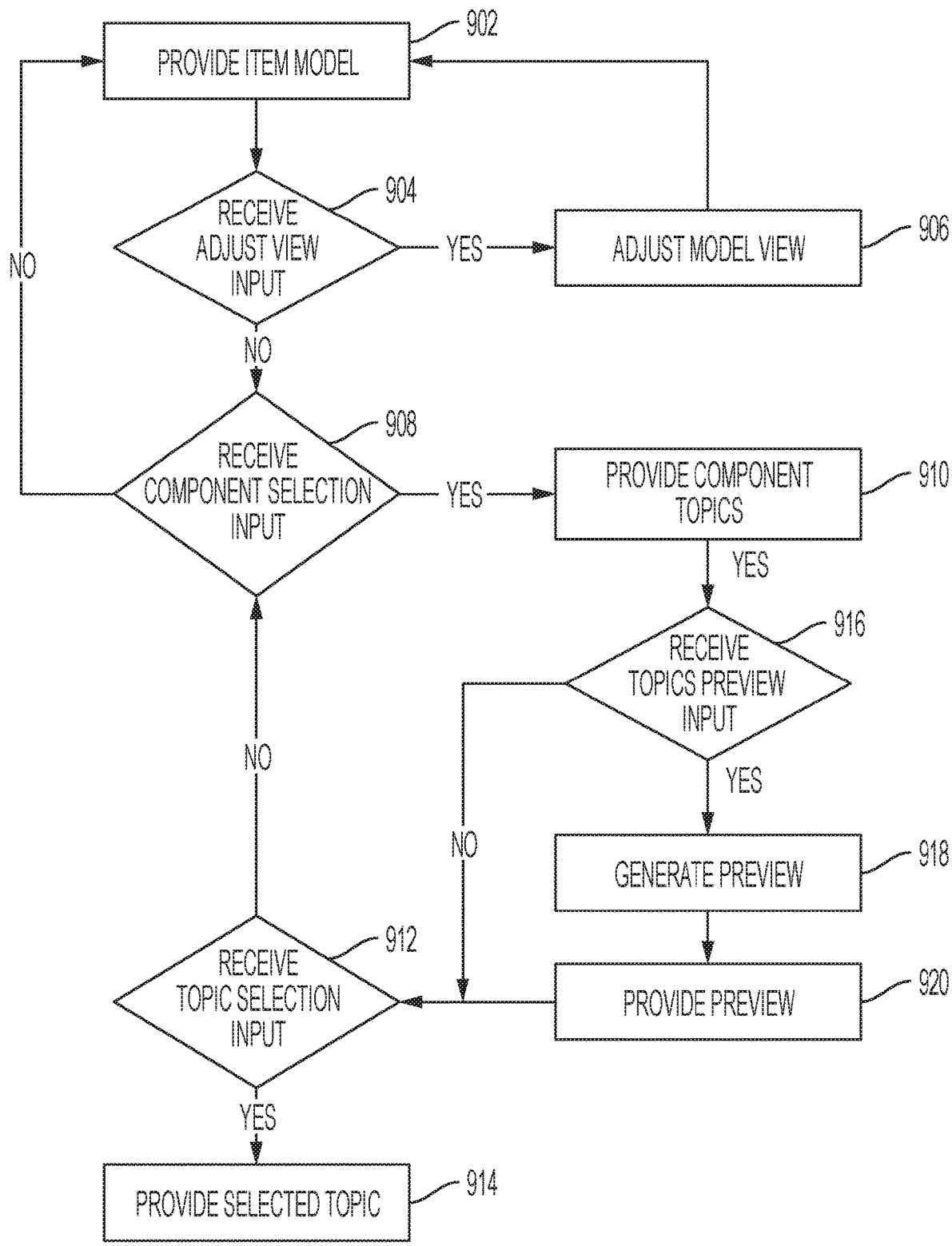

In various embodiments, an AR/VR interactive feature preview may be provided by an appropriate computing entity. For example, a user (e.g., operating a user computing entity 105) may motion/gesture/move to request that AR/VR interactive feature previews be provided (e.g., via a settings menu, user preferences associated with a user profile, in response to certain actions/triggers, and/or the like). FIG. 9 provides a flowchart similar to that illustrated in FIG. 6 for various embodiments configured to provide an AR/VR interactive feature preview. Starting at step/operation 902, a model of the item can be provided. For example, the management system 110 and/or user computing entity 105 may provide the 2D or 3D model and/or cause the 2D or 3D model to be displayed to the user (e.g., via the AR/VR user interface of the user computing entity 105). The 2D or 3D model may comprise one or more 2D or 3D visual representations. Each 2D or 3D visual representation may be configured to represent one or more components of the item. For example, various 2D or 3D visual representations may be configured to represent assemblies, sub-assemblies, sub-sub-assemblies, systems, subsystems, sub-subsystems, individual parts, and/or the like associated with the item. FIG. 7 illustrates an exemplary model 420 wherein the item is a bicycle.

In various embodiments, the 2D or 3D model may be provided as an AR/VR exploded view, top view, side view, bottom view, front view, back view, cross-sectional view, partial view, and/or the like. In various embodiments, the 2D or 3D model may be provided as a two-dimensional view of the item or as a three-dimensional view which, in some embodiments, may be manipulated to provide various views. In various embodiments, the AR/VR user interface may provide model view adjustment options. For example, a user may motion/gesture/move to request to change the view of the 2D or 3D model (e.g., an AR/VR side view may be provided and the user may motion/gesture/move to request an AR/VR top view), rotate the 2D or 3D model, zoom in and/or out, and/or the like. At step/operation 904, as shown in FIG. 9, it is determined if view adjustment input has been received. If, at step/operation 904, it is determined that view adjustment input has been received, then, perhaps in response thereto, the view adjustment is made and the updated 2D or 3D model can be provided at step/operation 906. For example, the management system 110 and/or user computing entity 105 may adjust the view as requested and provide the updated 2D or 3D model to the user (e.g., via the AR/VR user interface of the user computing entity 105).

If, at step/operation 904, it is determined that view adjustment input has not been received, then at step/operation 908 it is determined if input indicating user selection/identification of a component has been received. For example, a user (e.g., operating a user computing entity 105) may use a motion/gesture/movement to select or hover over a component or component callout 422 or use a voice input to select a component or component callout 422, such input may be received by the management system 110 and/or user computing entity 105. After receiving input indicating user selection/identification of a component, or in response thereto, a list of topics (e.g., a list of AR/VR interactive features to topics) associated with the selected component are provided at step/operation 910. For example, the management system 110 or the user computing entity may provide topics associated with the selected component to the user (e.g., via the AR/VR user interface of the user computing entity 105). For example, a component topics window 424 may be displayed (e.g., via the AR/VR user interface) providing a list of topics associated with the component indicated by the selected callout 423. In various embodiments, the component topics window 424 may be a tool tip, dialog box, tear-off window, and/or the like.

In the exemplary AR/VR user interface illustrated in FIG. 7, the selected callout 423 is the component callout corresponding to the front wheel assembly of the bicycle. Component topics window 424 provides a list of topics related to the front wheel assembly of the bicycle. For example, the component topics window 424 provides topic options such as removal of the front wheel assembly, an illustrated parts breakdown (IPB) of the front wheel assembly, a description of the front wheel assembly, installation of the front wheel assembly, troubleshooting the front wheel assembly, and other topics. For other items, other topics may be available via the component topics window 424 such as wiring information/data, testing information/data, subsystems or sub-assemblies of the selected component, regular maintenance information/data, and/or the like as appropriate for the item and selected component.

Returning to FIG. 9, at step/operation 916 it is determined if input requesting an AR/VR interactive feature preview has been received. For example, a user (e.g., operating a user computing entity 105) may use a motion/gesture/movement to select over a topic in the component topics window 424 or use a voice input to select a topic in the component topics window 424, such input may be received by the management system 110 and/or user computing entity 105. After receiving input indicating user selection/identification of a topic, or in response thereto, an AR/VR interactive feature preview is generated at step/operation 918. For example, the management system 110 and/or the user computing entity 105 may access the data module associated with the selected topic and generate a topic preview. For example, for a particular topic, a user will be provided with AR/VR user interface view providing information/data, tables, instructions, figures, AR/VR interactive features to additional and/or related information, and/or the like associated with the selected topic. The generated AR/VR interactive feature preview may provide a preview of the first five to fifty lines, for example, of the AR/VR user interface view that the user would be provided with if the user selected the topic.

Figure 10:
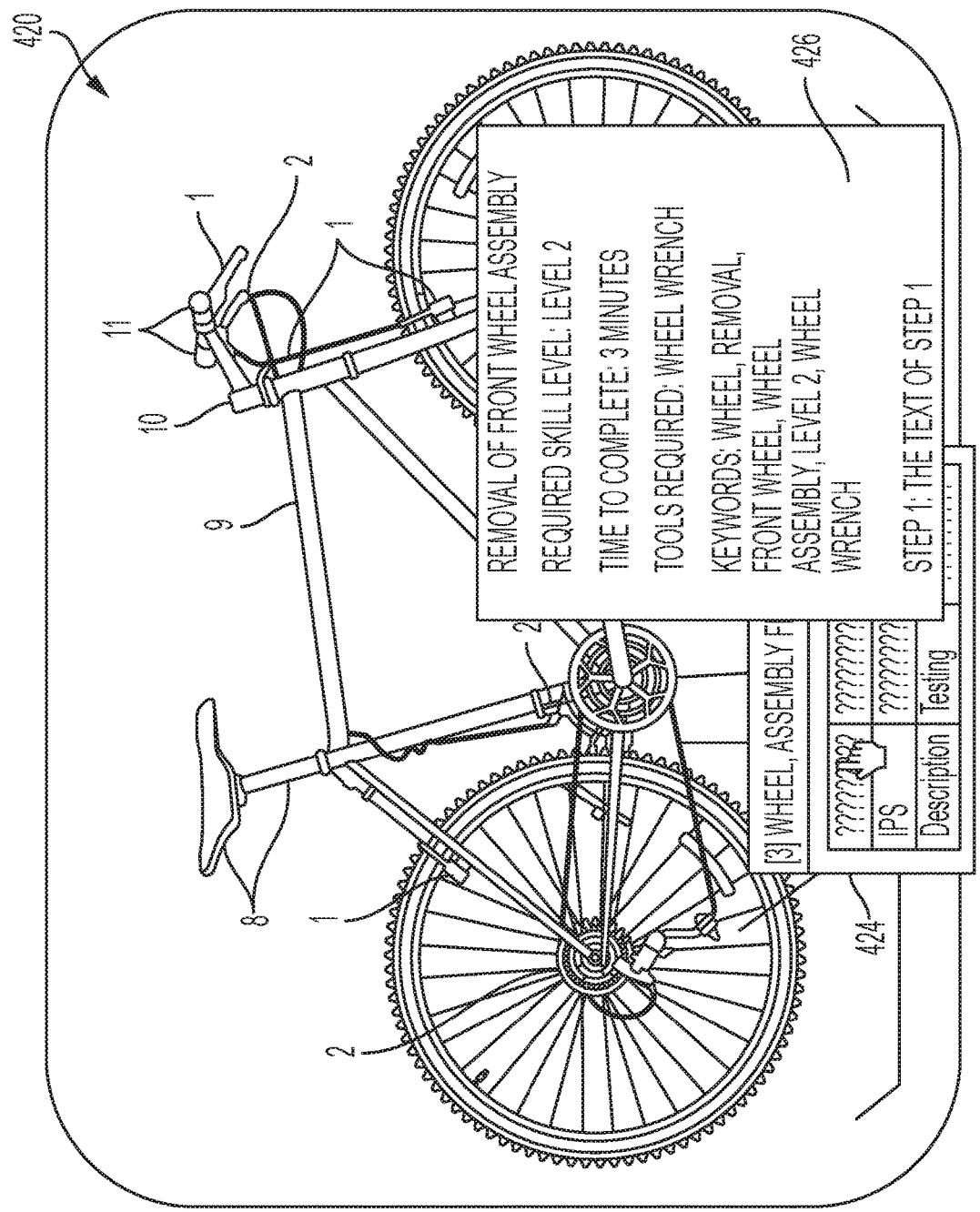

At step/operation 920, the AR/VR interactive feature preview can be provided to the user (e.g., via the AR/VR user interface of the user computing entity 105). FIG. 10 provides an exemplary view of an AR/VR user interface providing an AR/VR interactive feature preview. For example, the user (e.g., operating a user computing entity 105) has selected the topic "removal" associated with the front wheel assembly. In response to receiving input indicating selection of the topic "removal" from the component topics window 424, the management system 110 and/or the user computing entity 105 accessed the data module associated with removal of the front wheel assembly and generated and provided the AR/VR interactive feature preview 426. For example, the AR/VR interactive feature preview 426 may be displayed (e.g., via the AR/VR user interface) providing a preview of the information/data associated with the selected topic. In various embodiments, the AR/VR interactive feature preview 426 may be provided as a tool tip, dialog box, tear-off window, and/or the like.

Returning to FIG. 9, at step/operation 912 it is determined if input selecting the topic has been received. For example, a user (e.g., operating a user computing entity 105) may select the topic from the component topics window 424 and/or AR/VR interactive feature preview 426. For example, the user (e.g., operating a user computing entity 105) may "tear away" AR/VR interactive feature preview 426, select an interactive feature in the AR/VR interactive feature preview 426, double click the topic in the component topic window 424, and/or the like. After determining that input selecting a topic has been received, or in response thereto, the data module associated with the selected topic is accessed and the selected topic can be provided, at step/operation 914. For example, the management system 110 and/or user computing entity 105 may access the data module associated with the selected topic and provide the selected topic via the AR/VR user interface. For example, if the user (e.g., operating a user computing entity 105) selected the "removal" topic associated with the front wheel assembly, information/data associated with removal of the front wheel assembly can be provided to the user (e.g., via the AR/VR user interface of the user computing entity 105).

In various embodiments, an AR/VR interactive feature preview may be provided for any AR/VR interactive feature provided via the AR/VR user interface. For example, an AR/VR interactive feature preview may be provided for topics provided in a table of contents or hierarchical list of topics and/or AR/VR interactive features to topics or references associated with an item. In various embodiments, an AR/VR interactive feature preview may be provided for topics provided within a window/AR/VR user interface view for a particular item. For example, the AR/VR user interface view provided when the user selects the removal topic associated with the front wheel assembly may contain an AR/VR interactive feature to the front wheel topic. If a user uses a motion/gesture/movement to select the AR/VR interactive feature to the front wheel topic or uses a finger or stylus to select the AR/VR interactive feature to the front wheel topic, an AR/VR interactive feature preview may be provided. In particular, the AR/VR interactive feature preview may provide the user (e.g., operating a user computing entity 105) to preview the AR/VR user interface view that would be reached by following a selected link. This may help the user decide if they wish to follow a selected AR/VR interactive feature without following the link, preventing the user from needing to take the time to retrace his or her steps back to the display from which the AR/VR interactive feature was followed. As will be recognized, a variety of approaches and techniques can be used to provide an AR/VR interactive feature preview.

c. Smart Preview

Figure 12:
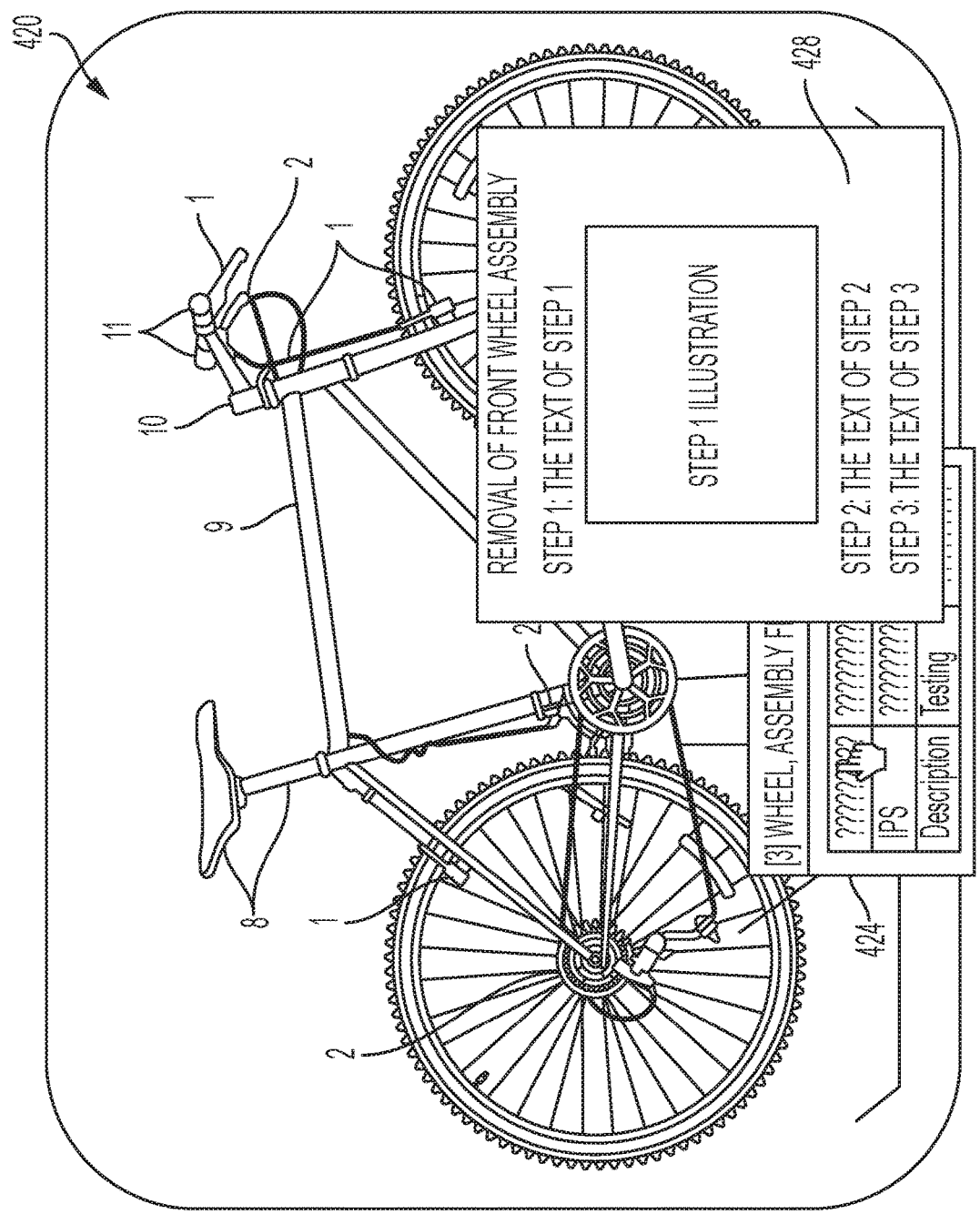

In various embodiments, a smart preview may be provided. In various embodiments, the information associated with the item may be stored in Standard Generalized Markup Language (SGML), Extensible Markup Language (XML), JavaScript Object Notation (JSON), or other file format using header data. Indeed, S1000D standard requires that data modules comprise a header section configured to identify the data module and provide status information comprising metadata for managing the data module (e.g., source information, security classification, applicability, change history, reason for change, verification status, and/or the like). The content portion of the data module may include further preface data (e.g., tables of relevant data, requirements for before a task is done, and/or the like). While this header and/or preface data may be important information, if included in the preview the preview may provide header and/or preface data and very little information directly related to the topic being previewed. For example, the AR/VR interactive feature preview 426 shown in FIG. 10 includes header and/or preface data and only displays the first step/operation of the selected topic. In contrast, the smart preview 428 shown in FIG. 12 provides more information directly related to the selected topic than the AR/VR interactive feature preview 426.

Figure 11:
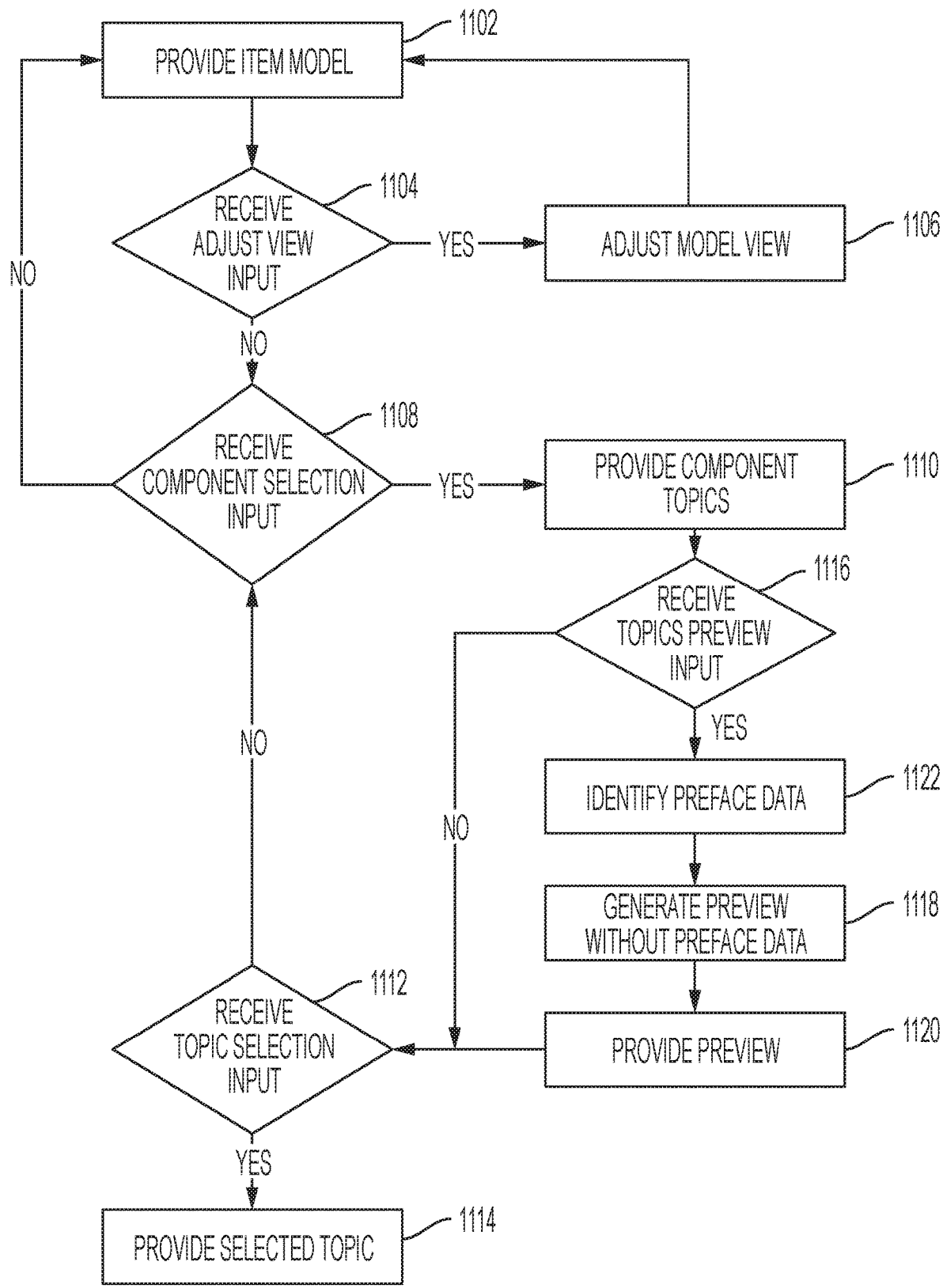

In various embodiments, a smart preview may be provided for one or more topics and/or AR/VR interactive features to topics. For example, a user (e.g., operating a user computing entity 105) may motion/gesture/move to request that smart previews be provided (e.g., via a settings menu, user preferences associated with a user profile, and/or the like). FIG. 11 provides a flowchart similar to that illustrated in FIGS. 6 and 9, but for various embodiments configured to provide a smart preview. Starting at step/operation 1102, a model of the item can be provided. For example, the management system 110 and/or user computing entity 105 may provide the 2D or 3D model and/or cause the 2D or 3D model to be displayed to the user (e.g., via the AR/VR user interface of the user computing entity 105). The 2D or 3D model may comprise one or more 2D or 3D visual representations. Each 2D or 3D visual representation may be configured to represent one or more components of the item. For example, various 2D or 3D visual representations may be configured to represent assemblies, sub-assemblies, sub-sub-assemblies, systems, subsystems, sub-subsystems, individual parts, and/or the like associated with the item. FIG. 7 illustrates an exemplary model 420 wherein the item is a bicycle.

In various embodiments, the 2D or 3D model may be provided as an AR/VR exploded view, top view, side view, bottom view, front view, back view, cross-sectional view, or partial view of the item. In various embodiments, the 2D or 3D model may be provided as a two-dimensional view of the item or as a three-dimensional view which, in some embodiments, may be manipulated to provide various views. In various embodiments, the AR/VR user interface may provide model view adjustment options. For example, a user may motion/gesture/move to request to change the view of the 2D or 3D model (e.g., an AR/VR side view may be provided and the user may motion/gesture/move to request an AR/VR top view), rotate the 2D or 3D model, zoom in and/or out, and/or the like. At step/operation 1104, as shown in FIG. 11, it is determined if view adjustment input has been received. If, at step/operation 1104, it is determined that view adjustment input has been received, then, (e.g., in response thereto) the view adjustment is made and the updated 2D or 3D model can be provided at step/operation 1106. For example, the management system 110 and/or user computing entity 105 may adjust the view as requested and provide the updated 2D or 3D model to the user (e.g., via the AR/VR user interface of the user computing entity 105).

If, at step/operation 1104, it is determined that view adjustment input has not been received, then at step/operation 1108 it is determined if input indicating user selection/identification of a component has been received. For example, a user (e.g., operating a user computing entity 105) may use a motion/gesture/movement to select or hover over a component or component callout 422 or use a voice input to select a component or component callout 422. Such input may be received by the management system 110 and/or user computing entity 105. After receiving input indicating user selection/identification of a component, or in response thereto, a list of topics (e.g., a list of AR/VR interactive features to topics) associated with the selected component are provided at step/operation 1110. For example, the management system 110 and/or the user computing entity 105 may provide a list of topics associated with the selected component to the user (e.g., via the AR/VR user interface of the user computing entity 105). For example, a component topics window 424 may be displayed (e.g., via the AR/VR user interface) providing topics associated with the component indicated by the selected callout 423. In various embodiments, the component topics window 424 may be a tool tip, dialog box, tear-off window, and/or the like.

In the exemplary AR/VR user interface illustrated in FIG. 7, the selected callout 423 is the component callout corresponding to the front wheel assembly of the bicycle. The component topics window 424 provides AR/VR interactive features to topics related to the front wheel assembly of the bicycle. For example, the component topics window 424 provides options such as removal of the front wheel assembly, an illustrated parts breakdown (IPB) of the front wheel assembly, a description of the front wheel assembly, installation of the front wheel assembly, troubleshooting the front wheel assembly, and other topics. For other items, AR/VR interactive features to other topics may be available via the component topics window 424 such as wiring information/data, testing information/data, sub-systems or sub-assemblies of the selected component, regular maintenance information/data, and/or the like as appropriate for the item and selected component.

Returning to FIG. 11, at step/operation 1116 it is determined if input requesting a smart preview has been received. For example, a user (e.g., operating a user computing entity 105) may use a motion/gesture/movement to select over a topic in the component topics window 424 or use a voice input to select a topic in the component topics window 424, such input may be received by the management system 110 and/or user computing entity 105. After receiving input indicating user selection/identification of a topic, or in response thereto, the data module associated with the selected topic is accessed and the preface and/or header data stored in the data module for the topic is identified at step/operation 1122. A smart preview is generated that does not include the preface and/or header data and that is based on the data module associated with the selected topic at step/operation 1118. For example, the management system 110 and/or the user computing entity 105 may access the data module associated with the topic, identify the preface and/or header data, and generate a topic preview that does not include the preface and/or header data. For example, if a particular topic is selected, a user will be provided with AR/VR user interface view providing information/data, tables, instructions, figures, AR/VR interactive features to additional and/or related information, and/or the like associated with the selected topic. The generated AR/VR interactive feature preview may provide a preview of the first five to fifty lines after the preface and/or header data, for example, of the AR/VR user interface view that the user would be provided with if the user selected to view the topic.

At step/operation 1120, the smart preview can be provided to the user (e.g., via the AR/VR user interface of the user computing entity 105). FIG. 12 provides an exemplary view of an AR/VR user interface providing a smart preview

428. For example, the user (e.g., operating a user computing entity 105) has selected the topic removal associated with the front wheel assembly. In response to receiving input indicating selection of the topic "removal" from the component topics window 424, the management system 110 and/or the user computing entity 105 accessed the associated data module, identified the preface and/or header data stored in the data module, and generated and provided the smart preview 428. For example, the smart preview 428 may be displayed (e.g., via the AR/VR user interface) providing a preview of the information/data associated with the selected topic. In various embodiments, the smart preview 428 may be provided as a tool tip, dialog box, tear-off window, and/or the like.

Returning to FIG. 11, at step/operation 1112 it is determined if input selecting the topic or an AR/VR interactive feature for a topic has been received. For example, a user (e.g., operating a user computing entity 105) may select the topic from the component topics window 424 and/or smart preview 428. For example, the user (e.g., operating a user computing entity 105) may "tear away" smart preview 428, select an interactive feature in the smart preview 428, double click the topic in the component topic window 424, and/or the like. After determining that input selecting a topic has been received, or in response thereto, data module for the selected topic is accessed and the data/information stored therein can be provided, at step/operation 1114. For example, the management system 110 and/or user computing entity 105 may provide the selected topic via an AR/VR user interface view. For example, if the user (e.g., operating a user computing entity 105) selected the AR/VR interactive feature associated with the removal topic associated with the front wheel assembly, information/data associated with removal of the front wheel assembly can be provided to the user (e.g., via the AR/VR user interface of the user computing entity 105).

In various embodiments, a smart preview may be provided for any AR/VR interactive feature provided via the AR/VR user interface. For example, a smart preview may be provided for topics and/or AR/VR interactive features to topics provided in a table of contents or hierarchical list of topics and/or AR/VR interactive features to topics associated with an item. In various embodiments, a smart preview may be provided for topics and/or AR/VR interactive features to topics provided within AR/VR user interface view for a particular item. For example, the AR/VR user interface view provided when the user selects the removal topic associated with the front wheel assembly may contain an AR/VR interactive feature to the front wheel topic. If a user uses a motion/gesture/movement to select to select the AR/VR interactive feature to the front wheel topic or uses a finger or stylus to select the AR/VR interactive feature to the front wheel topic, a smart preview may be provided. In particular, the smart preview may provide the user (e.g., operating a user computing entity 105) to preview the AR/VR user interface view that would be reached by following a selected link. This may help the user decide if they wish to follow a selected AR/VR interactive feature without following the link, preventing the user from needing to take the time to retrace his or her steps back to the display from which the AR/VR interactive feature was followed. As will be recognized, a variety of approaches and techniques can be used to provide a smart preview.

d. Filtering

In various embodiments, one or more methods for filtering information/data may be provided. For example, for items having many components a user may wish to filter the information/data provided. In another example, some information/data associated with an item may be classified at various security levels, a particular task (e.g., for repairing or inspecting a powered asset 100) may require a minimum skill level, and/or the like. Various filtering options will now be described in more detail.

i. Filter Parts List

Figure 13A:
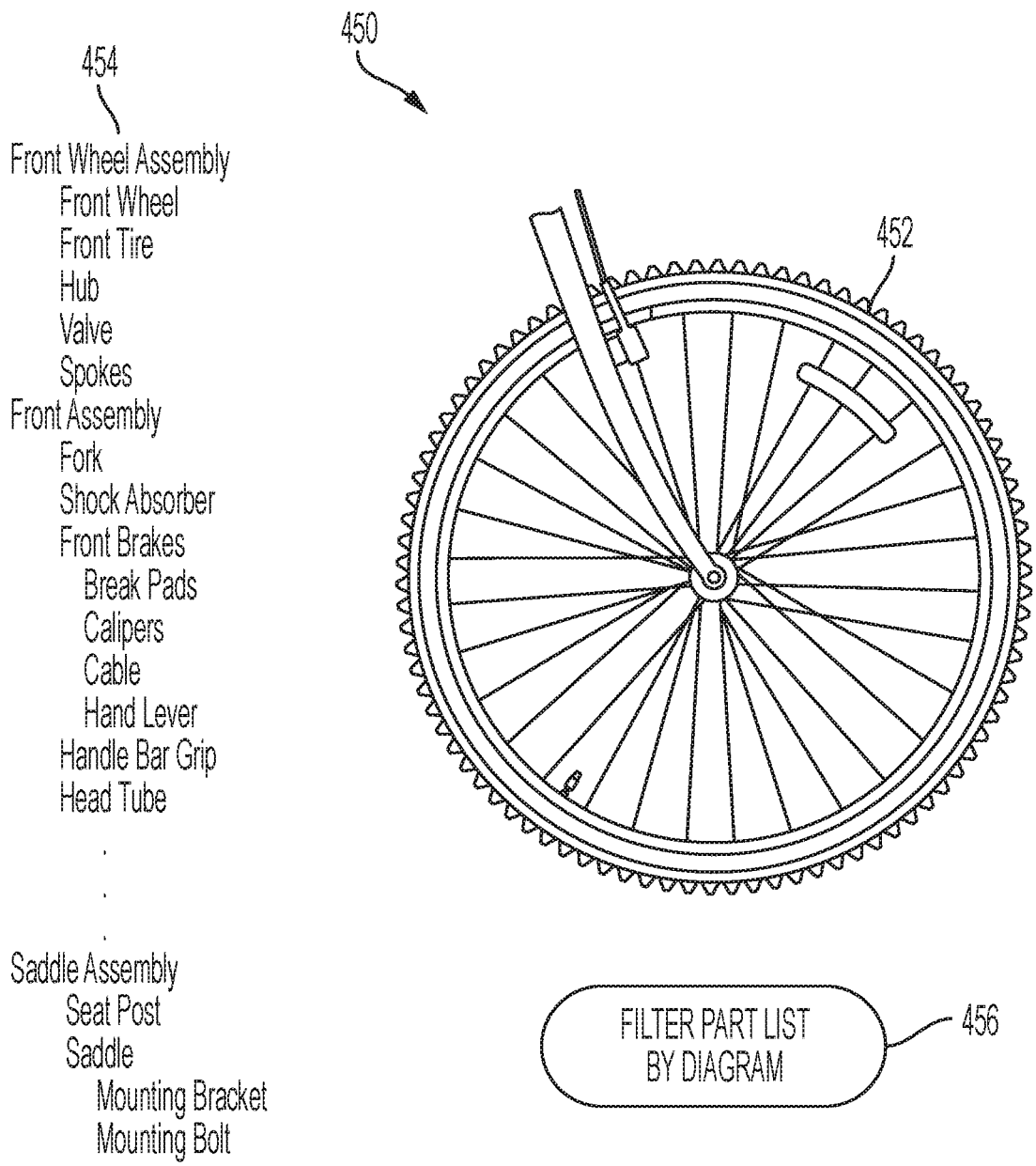

In various embodiments, a parts list may be provided. For example, a hierarchical component list may be provided, as shown in FIG. 13A. For example, parts list AR/VR user interface view 450 may comprise a parts list 454 and a diagram, model, or portion of a model 452. For example, in the illustrated parts list AR/VR user interface view 450, a portion of the bicycle model 420 can be provided, in particular the portion of the 2D or 3D model showing the front wheel assembly and how the front wheel assembly attaches to the frame of the bicycle. Indeed, in various scenarios it may be helpful to view diagrams and/or models or partial models showing particular components, assemblies, sub-assemblies, systems, subsystems, and/or the like. In some scenarios, a particular model view will only show some of the components of an item (e.g., the AR/VR top view of a model representing an airplane may not show the landing gear). In scenarios where the diagram, model, or portion of a model 452 displays only 2D or 3D visual representations representing only some of the components of the item, the parts list often still lists all of the components of the item.

Figure 14:
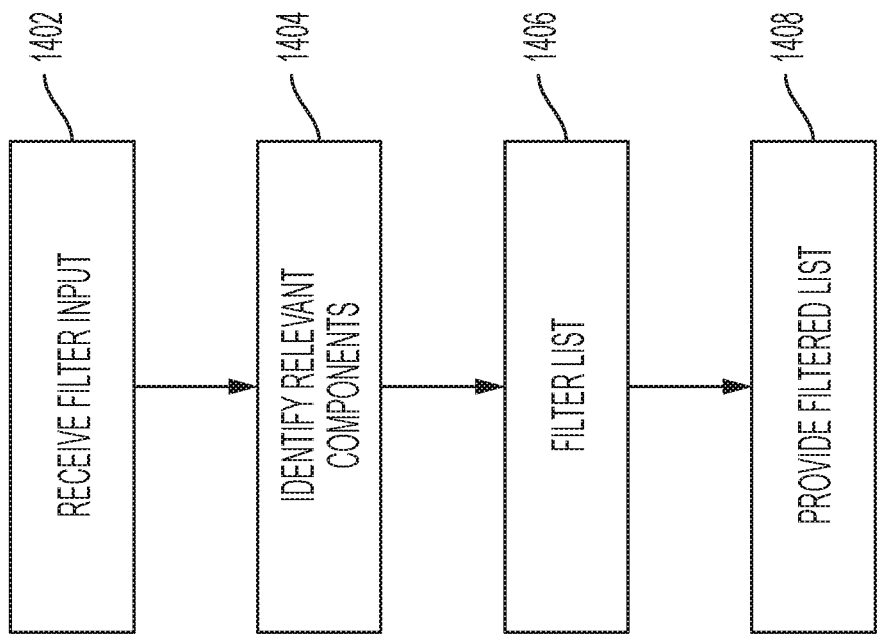

FIG. 14 provides an exemplary flowchart of processes, operations, and procedures that may be completed to filter a parts list 454 based on, for example, the diagram, model, or portion of a model 452 concurrently displayed by the illustrated parts list AR/VR user interface view 450. For example, at step/operation 1402, the filter input may be received. For example, the management system 110 and/or the user computing entity 105 may receive filter input indicating the user would like the parts list 454 to be filtered based on the diagram, model, or portion of a model 452 currently being displayed (e.g., via the AR/VR user interface of the user computing entity 105). In one embodiment, the illustrated parts list AR/VR user interface view 450 may comprise a filter part list by diagram interactive feature 456 and/or the like. In this example, the user may select the interactive feature 456 and after the user selects the interactive feature 456, or in response thereto, the management system 110 and/or the user computing entity 105 may receive input indicating the user would like the parts list 454 to be filtered based on the diagram, model, or portion of a model 452 being displayed (e.g., via the AR/VR user interface of the user computing entity 105).

At step/operation 1404, after receiving the filter input indicating the user would like the parts list 454 to be filtered based on, for example, the diagram, model, or portion of the model 452, or possibly in response thereto, the relevant components are identified. For example, after receiving the filter input, or in response thereto, the management system 110 and/or user computing entity 105 may identify the relevant components of the item. For example, the relevant components of the item may be the components represented by 2D or 3D visual representations in the diagram, model, or portion of a model 452 displayed by the illustrated parts list AR/VR user interface view 450 (e.g., via the user computing entity 105). At step/operation 1406, the parts list 454 may be filtered based on the identified relevant components. For example, the management system 110 and/or the user computing entity 105 may filter the parts list 454 based on the identified relevant components.

Figure 13B:
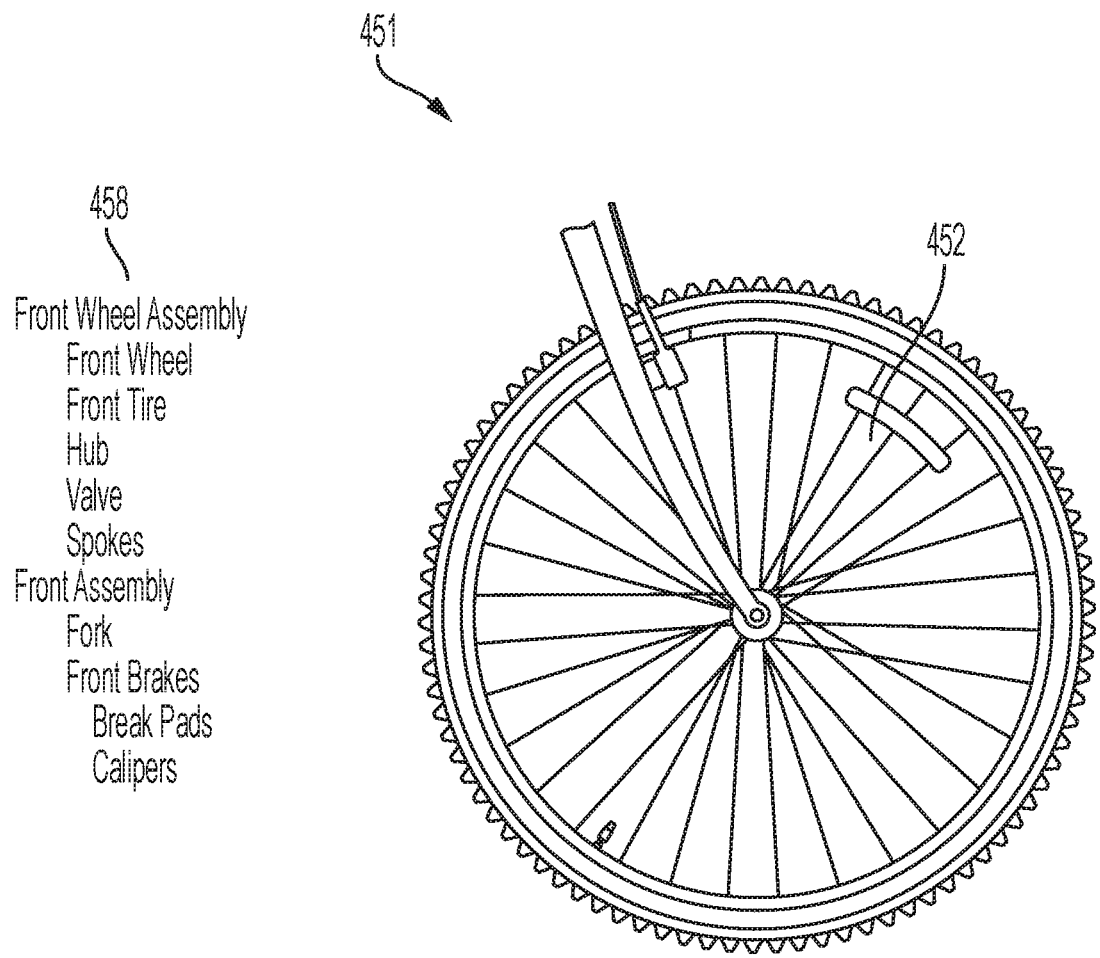

At step/operation 1408, a filtered parts list can be provided. For example, the management system 110 and/or the user computing entity 105 may provide the filtered parts list for an AR/VR display via the AR/VR user interface (e.g., via the user computing entity 105). FIG. 13B provides an exemplary filtered illustrated parts list AR/VR user interface view 451 comprising the diagram, model, or portion of the model 452 and the filtered parts list 458. The filtered parts list 458 may only consist of the components represented by 2D or 3D visual representations in the diagram, model, or portion of the model 452. As should be understood, a variety of methods for filtering an illustrated parts list may be incorporated into various embodiments of the present invention.

ii. Filter by Component Level

In various scenarios a user may desire to search and/or browse a list of components, table of contents, model of an item or the like based on a component level. For example, a user may wish to view the assemblies and sub-assemblies, but not the sub-sub-assemblies or individual parts of an item. Therefore, various embodiments provide for a user to filter lists of components, tables of contents, and models based on a component level.

Figure 15:
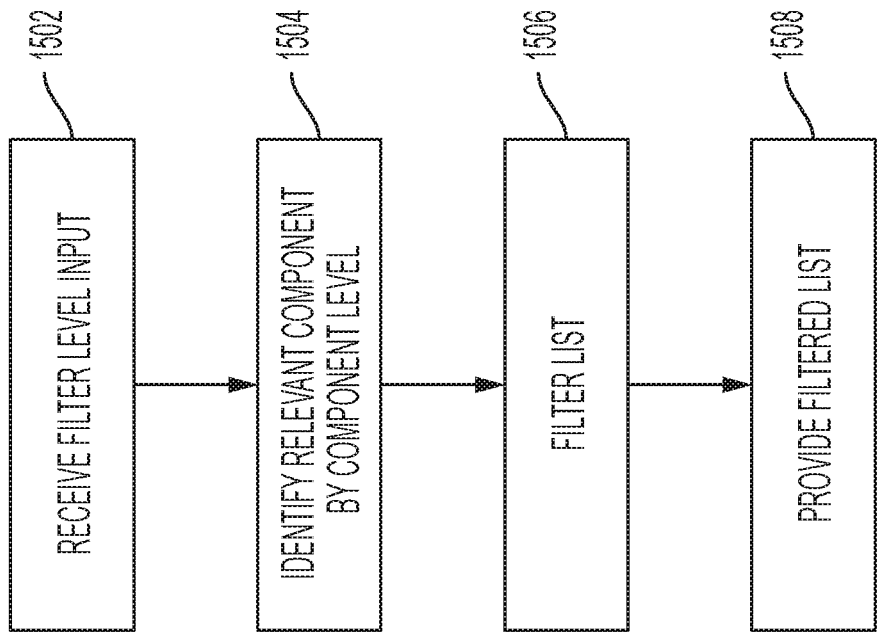

FIG. 15 provides an exemplary flowchart of processes and operations that may be completed to filter a list of components, table of contents, components represented by a model, or the like based on component level. At step/operation 1502, filter level input is received (e.g., by gestures, motions, movement, audio, and/or the like). For example, the management system 110 and/or the user computing entity 105 may receive filter level input indicating the component level(s) for which the user would like the list of components, table of contents, components represented by a model, or the like filtered. For example, the user may provide input via the AR/VR user interface indicating that the list of components, table of contents components represented by the 2D or 3D model and/or the like should be filtered to consist of only assemblies; assemblies and sub-assemblies; only sub-assemblies; assemblies, sub-assemblies, and sub-sub-assemblies; assemblies, sub-assemblies, sub-sub-assemblies, and parts; and/or the like. In various embodiments, the filter level input comprises a component level.

At step/operation 1504, the relevant components are identified. For example, the management system 110 and/or the user computing entity 105 may identify the relevant components. For example, the components having a component level equal to that of the level identified in the filter level input or components having a component level equal to or less than that of the level identified in the filter level input may be identified as relevant components. In some embodiments, the component level of a component may be identified by the number of dots in front of the component name. For example, names of some components might be "assembly 1," ".sub-assembly 1," ".part 1," "..sub-sub-assembly 1", "..part 2," " . . . sub-sub-sub assembly 1," " . . . part 3," and/or the like. For example, if the filter level input identified the filter level as one, components having zero or one dot in front of the name of the component will be identified. In one embodiment, the component level of a component may be identified based on the header and/or preface data stored in association with the data module for the topic. It should be understood that a variety of methods for identifying the component level of a component may be used when identifying the relevant components.

At step/operation 1506, the component list, table of contents, 2D or 3D visual representations comprising the 2D or 3D model, and/or the like is/are filtered based on the identified relevant components and/or filter level input. For example. the management system 110 and/or the user computing entity 105 may filter the component list, table of contents, 2D or 3D visual representations comprising the 2D or 3D model, and/or the like based on the identified relevant components and/or the filter level input. For example, the component list, table of contents, 2D or 3D visual representations comprising the 2D or 3D model and/or the like may be filtered to create a level-limited component list, table of contents, model, and/or the like that may consist of the identified relevant components. For example, the component list, table of contents, 2D or 3D visual representations comprising the 2D or 3D model and/or the like may be filtered to consist of the identified relevant components. At step/operation 1508, the filtered component list, table of contents, 2D or 3D visual representations comprising the 2D or 3D model, and/or the like, can be provided. For example, the management system 110 and/or user computing entity 105 may provide the filtered component list, table of contents, model, and/or the like. For example, the filtered component list, table of contents, model, and/or the like may be displayed to the user via the AR/VR user interface (e.g., via the user computing entity 105). As will be understood, a variety of methods may be used to filter component lists, tables of contents, components illustrated in a model, and/or the like based on the component level associated with each component.

iii. Multi-Configuration Filter

In various embodiments, a user may wish to filter the components and/or topics associated with an item based on various filter criteria. Example filter criteria may comprise an item identifier (e.g., a specific tail number, a unit number, serial number, vehicle identification number (VIN), block or series number, and/or the like), an item make and/or model identifier, a modification identifier (e.g., identifying modifications associated with the item, whether the item is pre-modification or post-modification), a location (e.g., a geographical location), a security level, a skill level, a skill code (e.g., military, aviation, and/or industry skill codes), mission type, and/or the like and/or combinations thereof. In various embodiments, the filter criteria may be provided by a user (e.g., operating a user computing entity 105), associated with a user profile, and/or the like.

Figure 16:
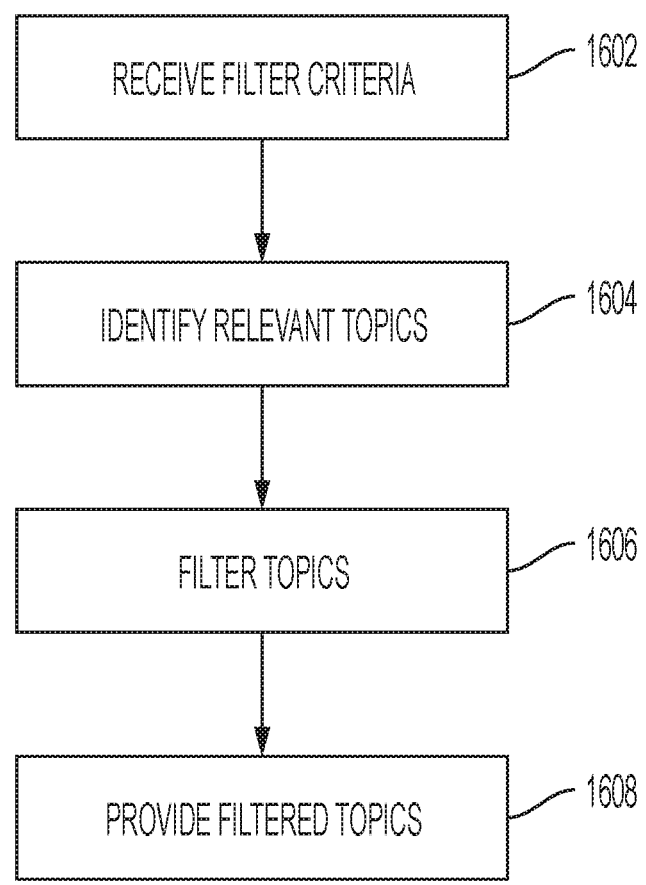

FIG. 16 provides a flowchart illustrating processes and operations that may be completed in various embodiments of the present invention. At step/operation 1602, filter criteria input is received (e.g., by gestures, motions, movement, audio, and/or the like). For example, the management system 110 and/or the user computing entity 105 may receive filter criteria input. For example, the user may provide input indicating filter criteria, filter criteria may be stored in association with a user profile and accessed when the user logs in (e.g., provides a username and password), and/or the like. In various embodiments, the filter criteria may comprise one or more of item identifier (e.g., a specific tail number, a unit number, serial number, vehicle identification number (VIN), block or series number, and/or the like), an item make and/or model identifier, a modification identifier (e.g., identifying modifications associated with the item), a location (e.g., a geographical location), a security level, a skill level, a skill code (e.g., military, aviation, and/or industry skill codes), mission type, and/or the like and/or combinations thereof.

At step/operation 1604, the relevant components and/or topics are identified based at least in part on the filter criteria. For example, the management system 110 and/or user computing entity 105 identifies the relevant components and/or topics based on the filter criteria. For example, components and/or topics may be identified as relevant based on the filter criteria and header and/or preface data associated with data modules associated with the components and/or topics. At step/operation 1606, the components and/or topics are filtered based on the identified relevant topics. For example, the management system 110 and/or the user computing entity 105 may filter the topics based on the identified relevant components and/or topics.

At step/operation 1608, the filtered topics are provided. For example, the management system 110 and/or the user computing entity 105 may provide the filtered topics. For example, the component list, table of contents, model, topics listed in a component topics window 424, and/or the like may be filtered based on the filter criteria and/or the identified relevant components and/or topics. For example, the relevant components and/or topics and/or filtered component list, table of contents, visual representations representing components comprising a model, topics listed in a component topics window 424, and/or the like are displayed via the AR/VR user interface. It should be understood that the components and/or topics may be filtered by a variety of criteria, combinations of criteria, and/or the like.

In some embodiments, the filter criteria will be used to filter each AR/VR user interface view for a particular user, a particular AR/VR user interface session, until input clearing the filter criteria is received, only for one particular AR/VR user interface view (e.g., the AR/VR user interface view provided in response to receiving the filter input), and/or the like.

e. Translations

In various embodiments, translations of topics may be provided. For example, a user may view a topic via the AR/VR user interface in an origin/base language and request the topic be translated into a target language. For example, the topic may comprise instructions for completing a task. The instructions may comprise diagrams illustrating one or more steps/operations and/or one or more components relevant to one or more steps. In various embodiments, a user may motion/gesture/move to request a translation of the topic and/or steps for completing the task (e.g., for repairing or inspecting a powered asset 100) comprising the topic. In various embodiments, the entire topic may be translated into the target language. In other embodiments, only a portion of the topic is translated into the target language. For example, in some embodiments, only the verbs, or at least some of the verbs, are translated into the target language.

Figure 17A:
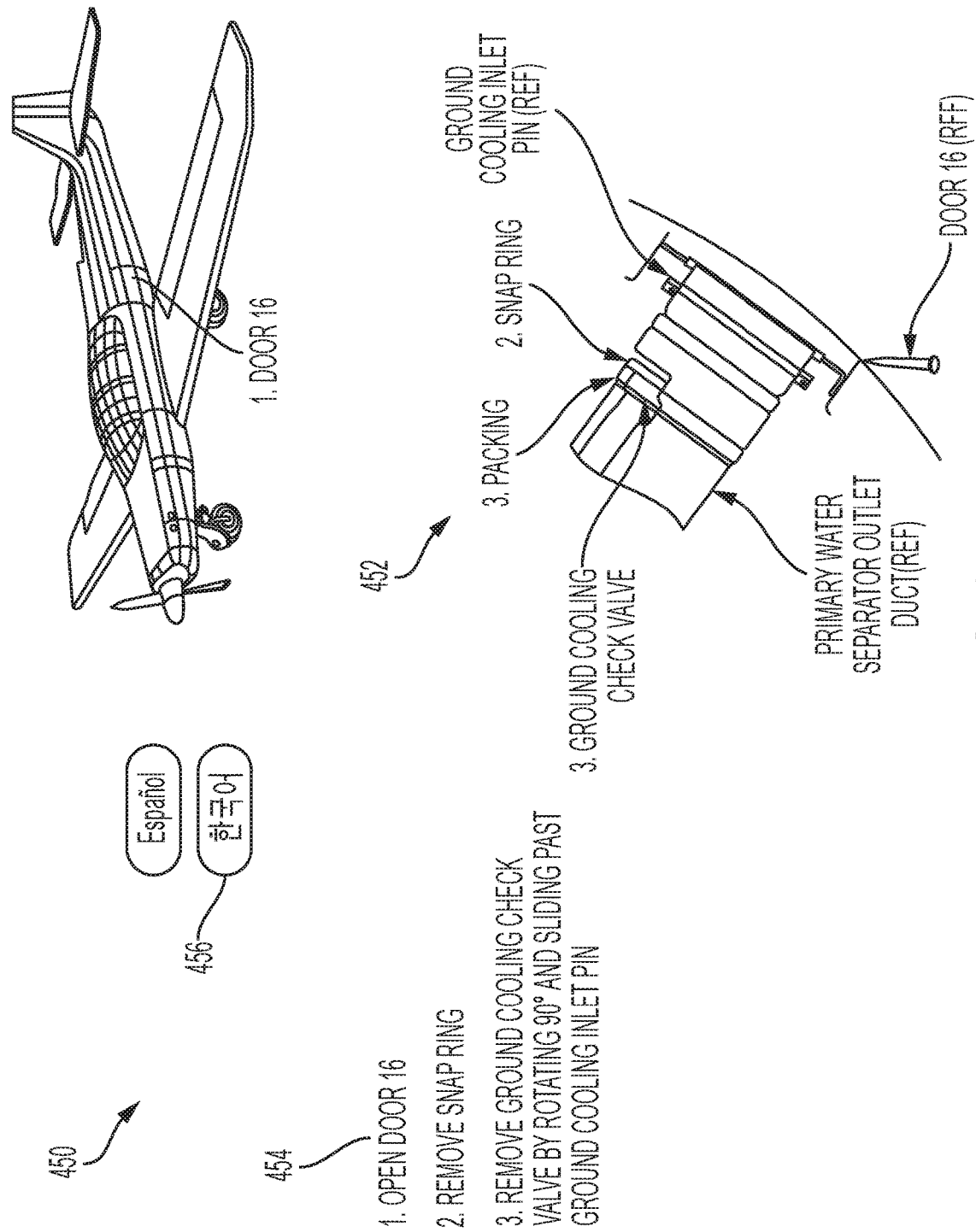
Figure 18:
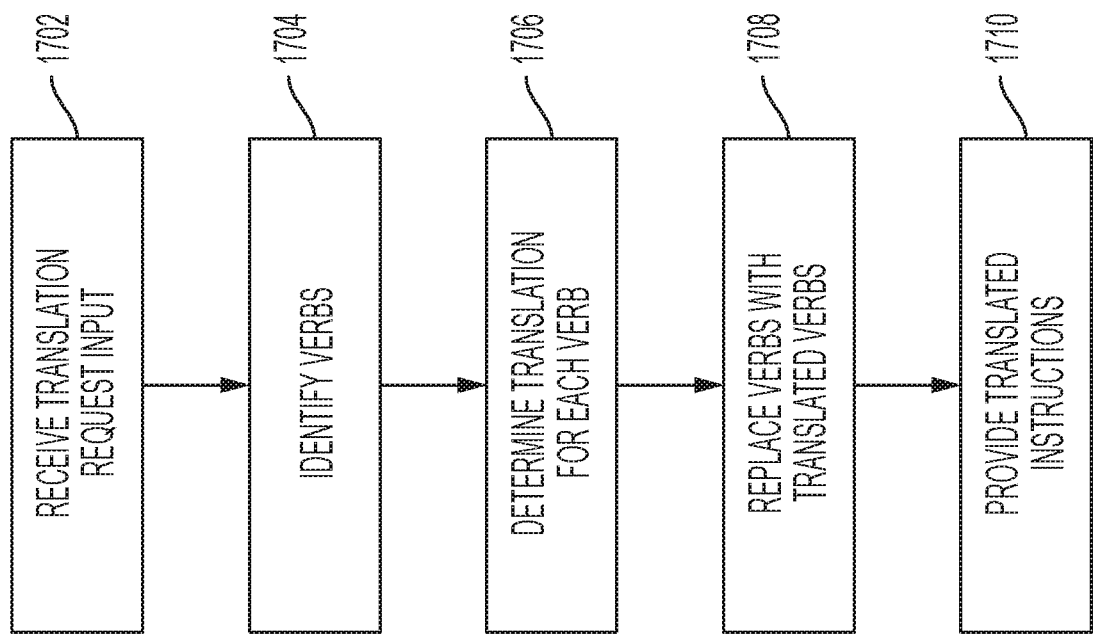

FIG. 17A provides an exemplary topic AR/VR user interface view 460. Diagram(s) 462 illustrate one or more steps/operations and/or one or more components relevant to one or more steps/operations of the task comprising the topic, as described by instructions 464. FIG. 18 provides a flowchart illustrating processes and operations that may be completed in various embodiments to provide translated topic and/or instructions for completing a task. At step/operation 1702, translation request input is received (e.g., by gestures, motions, movement, audio, and/or the like). For example, the management system 110 and/or the user computing entity 105 may receive translation request input. For example, a user may select translation request interactive feature 466 and/or otherwise indicate that a translation is requested. In various embodiments, the translation request input may identify at least one of an origin/base language that the topic or instructions 464 have been provided in, a target language that the user would like the topic or instructions 464 to be translated into, and/or the like.

At step/operation 1704, at least one of the verbs in the instructions 464 is identified. In some embodiments, all of the verbs in the instructions 464 are identified. For example, step/operation one of instructions 464 is "Open the door." "Open" is identified as one of the verbs of instructions 464 by an appropriate computing entity. For example, the management system 110 and/or the user computing entity 105 may identify the verbs in the instructions 464. In various embodiments, an XML file, SGML file, database, or other file may comprise a list of verbs and the verbs in the instructions 464 may be identified based on whether a word in the instructions 464 is present in the list of verbs. In one embodiment, the data module comprising the topic may comprise one or more tags indicating which words of the instructions 464 are verbs. A variety of methods may be used to identify the verbs in the instructions 464, as appropriate for the application.

At step/operation 1706, the translation for each identified verb into the target language is determined. For example, the management system 110 and/or the user computing entity 105 may determine the translation for each identified verb into the target language. In various embodiments, an XML file, SGML file, database, or other file may comprise mappings linking verbs in an origin/base language to an appropriate translation of the verb in one or more target languages. The XML file, SGML file, database, or other file may be accessed to determine the appropriate translation of each identified verb into the target language. For example, "문을 여는" may be identified as the translation of the verb "open" in the target language of Korean.

At step/operation 1708, the translated verbs are inserted into the instructions in place of the verbs in the origin/base language. For example, the management system 110 and/or the user computing entity 105 may insert the translated verbs into the instructions in place of the verbs in the origin/base language. For example, the verb "open" in step/operation one of the instructions 464 may be replaced by "문을 여는," for the target language of Korean.

Figure 17B:
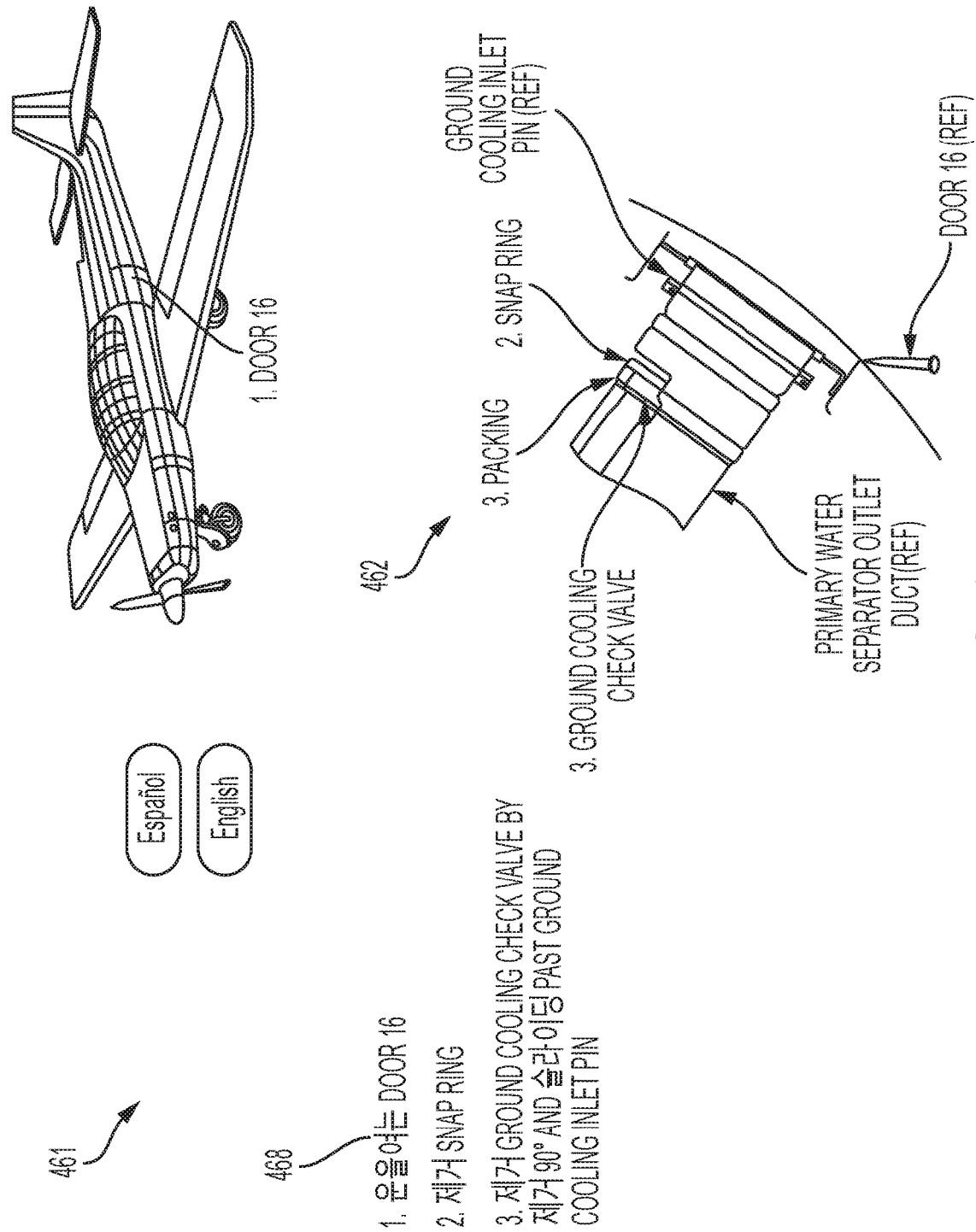

At step/operation 1710, the translated instructions 468 are provided. For example, the management system 110 and/or the user computing entity 105 may provide the translated instructions 468 (e.g., via the AR/VR user interface and/or user computing entity 105). FIG. 17B provides an exemplary translated topic AR/VR user interface view 461 comprising the diagram(s) 462 illustrating one or more steps/operations and/or one or more components relevant to one or more steps/operations of the task comprising the topic, and the translated instructions 468. The translated instructions 468 may describe the steps/operations that should be taken to complete the task wherein the verbs are provided in the target language and the nouns, prepositions, adjectives, adverbs, and conjunctions are provided in the origin/base language. The translated instructions 468 may also comprise reference numerals or the like allowing a user to identify components referenced by the translated instructions 468 and illustrated in the diagram(s) 462. It should be understood that various methods may be used to provide translated instructions wherein a portion of the instructions (e.g., the verbs) are translated into the target language.

f. Bookmarking a Topic

In various embodiments, a user may wish to bookmark a particular topic, a particular step/operation in a task comprising a topic, provide a bookmarked topic or step/operation to another user, and/or the like. For example, if a user is completing a task and reaches a step/operation that the user cannot complete due to the user's skill level, a tool that is needed but is not present, a part that is needed but is not present, the end of the user's shift, and/or the like, the user may bookmark the topic, location within the topic, step, and/or the like and may provide the bookmark to another user (e.g., a user coming in for the next shift).

Figure 19:
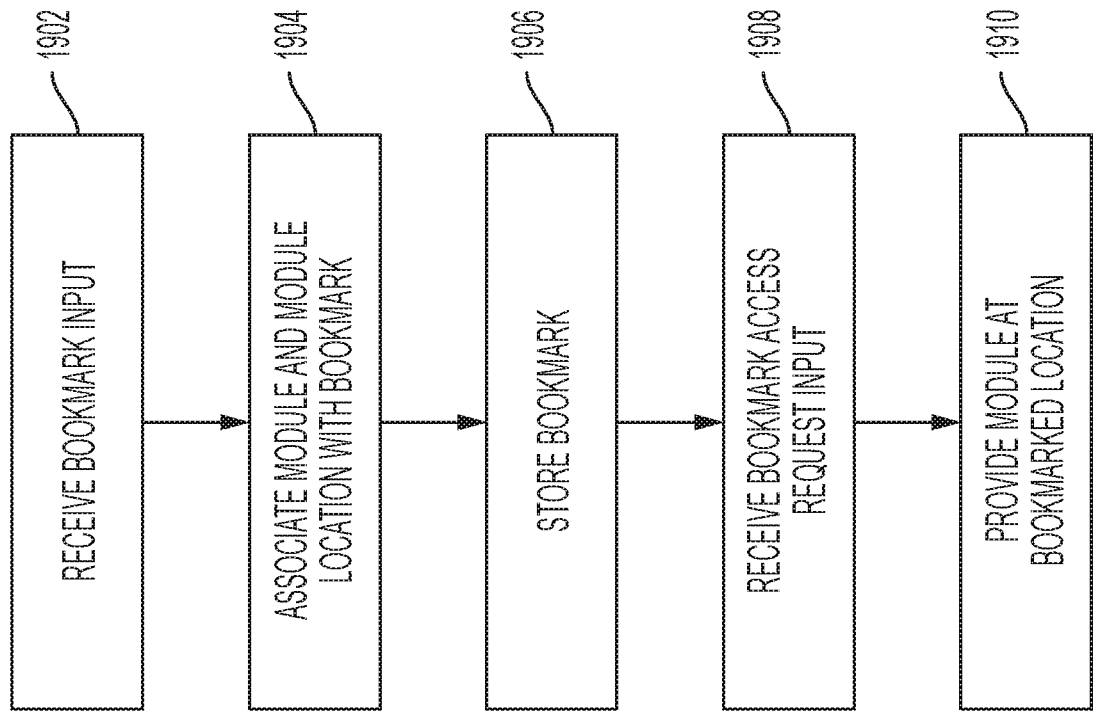

FIG. 19 provides a flowchart illustrating various processes, operations, and procedures that may be completed in accordance with various embodiments of the present invention for bookmarking a topic, portion of a topic, step, and/or the like. At step/operation 1902, bookmark input is received (e.g., by gestures, motions, movement, audio, and/or the like). For example, the management system 110 and/or the user computing entity 105 receives bookmark input. For example, the user may provide input requesting that a topic, portion of a topic, step, and/or the like be bookmarked. The bookmark input may identify bookmark data/information comprising at least one of a topic, a portion of a topic, a step, and/or the like to be bookmarked, the user requesting the bookmark, filter criteria relevant to the topic, portion of the topic, step, and/or the like, an expiration date and/or time for the bookmark, a user to which the bookmark should be provided, and/or the like. For example, the bookmark input may identify that step/operation 5 of topic A should be bookmarked, that the bookmark should expire in 24 hours, on Mar. 30, 2015, in one week, in one month, and/or the like, that the bookmark was requested by User A, that the bookmark should be provided to User B, and/or the like.

At step/operation 1904, the data module and/or data module location (e.g., a particular step, paragraph, table, row or column of a table, or the like) is associated with a bookmark. For example, the management system 110 and/or the user computing entity 105 associates the data module and/or data module location with the bookmark. For example, the data module and/or data module location identified by bookmark input is associated with a bookmark comprising the bookmark information/data.

At step/operation 1906, the bookmark is stored. For example, the management system 110 and/or the user computing entity 105 may store the bookmark in memory 310, 315, 422*a*, or 424*a*. The bookmark may then be provided to the user, another user identified by the bookmark information/data, or to a group of users (e.g., users associated with the same organization or team as the user who requested the bookmark, a group of users identified by the bookmark information/data, or the like). It should be understood that a variety of methods may be used to provide the bookmark to the user, another user identified in the bookmark information/data and/or a group of users. For example, an AR/VR interactive feature corresponding to the bookmark may be provided via the AR/VR user interface, for example in a bookmark menu, emailed to an email address associated with the user, the user identified in the bookmark information/data, or users of the group users, and/or the like.

At step/operation 1908, bookmark access request input is received (e.g., by gestures, motions, movement, audio, and/or the like). For example, the management system 110 and/or the user computing entity 105 receives bookmark access request input. For example, the user who requested the bookmark, a user identified in the bookmark information/data, or another user may select an AR/VR interactive feature or interactive feature representing the bookmark and/or the like.

At step/operation 1910, after receiving the bookmark access request input, or in response thereto, the data module identified by the bookmark can be provided at the bookmarked location within the data module. For example, the management system 110 and/or the user computing entity 105 may provide the data module identified by the bookmark can be provided at the bookmarked location within the data module (e.g., via the AR/VR user interface and/or user computing entity 105).

In various embodiments, the bookmark may be stored indefinitely or until a user provides input indicating the bookmark no longer needs to be stored. In one embodiment, a user may provide an expiration date or time for the bookmark and, upon reaching the expiration date or the expiration time passing, the bookmark is no longer stored and/or deleted. It should be understood that various modifications may be made to the described method for providing a bookmark without straying from the scope of the present invention.

g. Providing Augmented Reality Environment for a Topic

In various embodiments, an augmented reality environment may be provided while a user is viewing a topic. For instance, as previously discussed, the management system 110 and/or the user computing entity 105 may receive input indicating user selection/identification of a topic. Here, the topic may be associated with at least one data module and may correspond to a component (e.g., assembly, sub-assembly, sub-sub-assembly, system, subsystem, sub-subsystem, part, and/or the like) of a powered asset 100, a task (e.g., for repairing or inspecting a powered asset 100) or maintenance associated with the powered asset 100 or a component of the powered asset 100, and/or the like.

Accordingly, the selected topic may be provided to the user via an AR/VR user interface (e.g., via an augmented or virtual interface of the user computing entity 105). In various embodiments, the augmented reality environment may provide one or more features that are superimposed onto the user's line of vision as the user views his or her physical surroundings while also viewing technical data on the AR/VR user interface. For example, the computing entity 105 may be configured to allow the user to view a topic on the powered asset 100 while also viewing the physical surroundings of the powered asset 100 and/or the asset 100, itself, in the user's line of vision. Here, the information of the topic may be superimposed onto the user's line of vision by being displayed on the AR/VR user interface while the user is also viewing the physical surroundings of the powered asset 100 and/or the asset 100, itself, via the AR/VR user interface.

Figure 20:
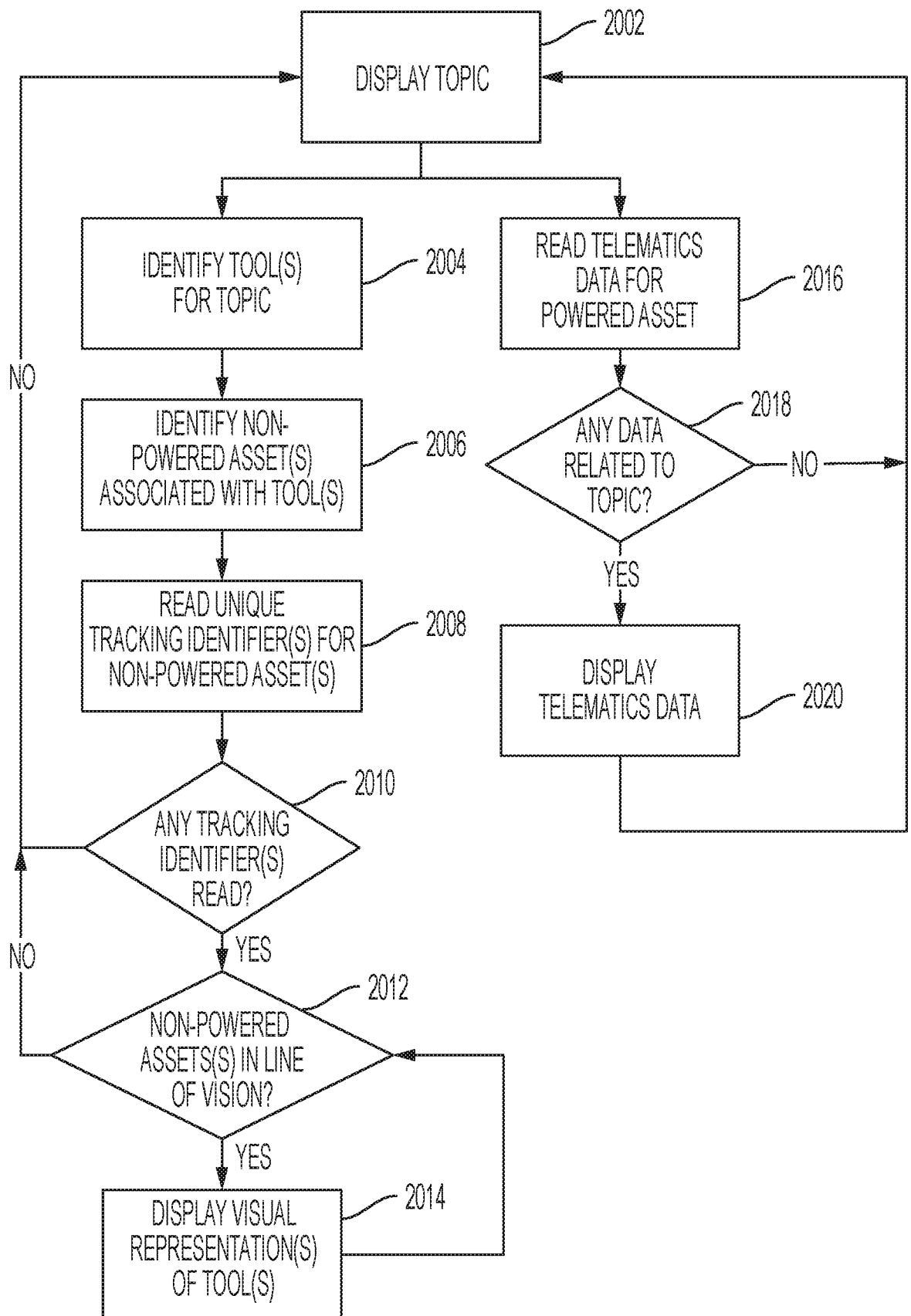

FIG. 20 provides an exemplary flowchart of processes and operations that may be completed in accordance with various embodiments to provide an augmented reality environment while the user is viewing a topic. At step/operation 2002, the topic is displayed. For example, the management system 110 and/or user computing entity 105 may display the topic to the user (e.g., via the AR/VR user interface of the user computing entity 105). As previously noted, the topic may correspond to a component (e.g., assembly, sub-assembly, sub-sub-assembly, system, subsystem, sub-subsystem, part, and/or the like) of the powered asset 100, a task (e.g., for repairing or inspecting a powered asset 100) or maintenance associated with the powered asset 100 or a component of the powered asset 100. For example, the user may have been provided a list of topics for a component on a component topic window and he or she may have selected a topic provided in the list by double clicking on the topic on the window.

At step/operation 2004, the management system 110 and/or user computing entity 105 may determine whether the topic involves any tools 103. For example, the topic may be directed to a maintenance task to be completed for a component of the powered asset 100. Accordingly, one or more tools 103 may be needed by the user to complete the task. Such tools 103 may be mentioned in the instructions (e.g., text data) for the task that are currently displayed on the AR/VR user interface. Therefore, the management system 110 and/or user computing entity 105 may be configured to search the data for the topic and identify any occurrences of tools 103 found in the data. For example, in particular embodiments, the management system 110 and/or user computing entity 105 may be configured to perform text recognition on the text data to identify occurrences of the names of tools 103 found in the instructions for the task.

At this point, the management system 110 and/or user computing entity 105 identifies any non-powered assets 107 that may be associated with any of the tools 103 involved with the topic at step/operation 2006. As previously mentioned, tools 103 may be associated with a non-powered asset 107 and therefore, such tools 103 may be considered to be located where the non-powered asset 107 is located. For example, a non-powered asset 107 may be storage used to store one or more tools 103. Therefore, the tools 103 stored in the non-powered asset 107 are expected to be located within the asset 107.

In addition, as previously discussed, a non-powered asset 107 may be associated with a unique tracking identifier. Accordingly, in particular embodiments, the non-powered asset 107 may be associated with some mechanism such as a non-powered asset beacon/tag/sensor 155 configured to transmit, advertise, broadcast, and/or the like the unique tracking identifier to facilitate identifying the location of the non-powered asset 107. Therefore, in particular embodiments, the management system 110 and/or user computing entity 105 may read the unique tracking identifier(s) for the non-powered asset(s) 107 associated with the tool(s) 103 involved in the topic at step/operation 2008.

In other embodiments, a non-powered asset 107 may store the unique tracking identifier in text, a barcode, a tag, a QR code, and/or the like that is readable. Here, the text, barcode, tag, QR code, and/or the like may be affixed to the non-powered asset 107. Therefore, the non-powered asset 107 may be present in the user's physical surroundings and the user computing entity 105 may be configured to read (e.g., scan) the unique tracking identifier for the non-powered asset 107 at step/operation 2108 from the text, barcode, tag, QR code, and/or the like.

Next, the management system 110 and/or user computing entity 105 determines whether the unique tracking identifier has been read for any of the non-powered asset(s) 107 at step/operation 2010. If so, then the management system 110 and/or user computing entity 105 determines whether any of the non-powered asset(s) 107 are visible in the user's current line of vision at step/operation 2012.

For example, the unique tracking identifier may serve as a marker. Here, the management system 110 and/or user computing entity 105 may configured to use one or more markers placed in the physical environment as a point of reference to help the management system 110 and/or user computing entity 105 determine whether a particular non-powered asset 107 is in the user's line of vision. When camera of the user computing entity 105 detects a marker (e.g., the unique tracking identifier from a QR code found on an item located in the line of vision), the management system 110 (receiving information/data on the detection of the marker from the user computing entity 105) and/or user computing entity 105 compares the information/data from the marker with all the markers it is aware of. Once the management system 110 and/or user computing entity 105 finds a match with a particular non-powered asset 107, it uses the marker's information to determine the non-powered asset 107 is located in the user's field of vision, as well as mathematically determine the pose of the camera so that it can then display appropriate information/data at the appropriate position on the AR/VR user interface.

In instances in which makers may not be present, the management system 110 and/or user computing entity 105 may gather information from the user computing entity 105 and use a recognition algorithm to look for patterns, colors, and/or other features that might identify the user's line of vision. Such information may include, for example, location information via GPS, geographic data, accelerometer data, compass data, internal clock, and/or the like. Those of ordinary skill in the art can envision other processes, mechanism, and data that may be used in determining what physical objects are currently located in the user's line of vision.

Accordingly, if the management system 110 and/or the user computing entity 105 determines one or more of the non-powered asset(s) 107 associated with one or more of the tool(s) 103 referenced in the topic are located in the user's line of vision, then a visual representation of each of the one or more tool(s) 103 is displayed on the AR/VR user interface at step/operation 2014. Depending on the embodiment, the visual representation for a tool 103 may be, for example, a 2D or 3D digital image of the tool 103 in any of a variety of formats, such as JPEG, JFIF, JPEG2000, EXIF, TIFF, RAW, DIV, GIF, BMP, PNG, PPM, and/or the like. In other embodiments, the visual representation may be a text description of the tool 103 read from a document in any of a variety of formats, such as DOCX, HTMLS, TXT, PDF, and/or the like. In other embodiments, the visual representation may be a video showing the tool 103 in any of a variety of formats, such as MOV, AVI, MP4, MKV, and/or the like. Those of ordinary skill in the art can envision other forms of visual representations of the tool(s) 103 that can be used in light of this disclosure.

Further, in some embodiments, the visual representation (s) of the tool(s) 103 may be positioned on the AR/VR user interface so that they are superimposed over the non-powered asset(s) 107 viewable in the line of vision for the user. This can allow the user to identify where each of the tool(s) 103 is located in the physical environment so that the tool(s) 103 can be gathered for use by the user.

In particular embodiments, additional information/data may be gathered and displayed on the AR/VR user interface associated with the topic. For instance, telematics information/data may be gathered from the powered asset 100 and such information/data may be displayed on the AR/VR user interface to assist the user. For example, the topic may involve a maintenance procedure that is to be performed on a component of the powered asset 100. Here, telematics information/data associated with the component may be gathered from one or more telematics sensors 125 attached to, affixed to, disposed upon, integrated into, and/or like with respect to the powered asset 100. Such information/data may be gathered using some type of device such as an information/data collection device 130 attached to, affixed to, disposed upon, integrated into, and/or like with respect to the powered asset 100 and transmitted to and/or read by the management system 110 and/or user computing entity 105.

Accordingly, in some embodiments, the telematics information/data gathered from the powered asset 100 may be filtered based on the topic being viewed by the user. For example, the topic may involve a maintenance procedure (task) to be performed by the user on a particular component of the powered asset 100. Therefore, the management system 110 and/or user computing entity 105 may be configured to filter the telematics information/data so that only the information/data that is relevant to the component is displayed to the user.

Therefore, returning to FIG. 20, the telematics information/data is read by the management system 110 and/or user computing entity 105 at step/operation 2016. As noted, in some embodiments, the information/data may be filtered based on the topic being displayed to the user. Thus, the management system 110 and/or user computing entity 105 determines whether any of the telematics information/data is applicable to the topic at step/operation 2018. If so, then the management system 110 and/or user computing entity 105 displays the applicable telematics information/data on the AR/VR user interface at step/operation 2020. It is noted that in some embodiments, the management system 110 and/or user computing entity 105 may be configured to determine what telematics information/data is relevant to the topic before reading the telematics information/data for the powered asset 100 and then only reading the relevant telematics information/data. In other words, in some embodiments, steps/operations 2016 and 2018 shown in FIG. 20 may be reversed.

For example, the user may be repairing a component on the powered asset 100 that has lost its power supply. The user may select a topic to view that provides a repair procedure (task) for restoring the power supply to the component. In this case, telematics information/data may be collected on the power supply showing the voltage being produced by the power supply. Therefore, the management system 110 and/or user computing entity 105 may recognize the telematics information/data being collected from the power supply is applicable to the repair procedure and may display the information/data on the AR/VR user interface while the user is performing the procedure so that the user can see the status of the power supply as he or she is working. As a result, the user may be able to better evaluate when he or she has resolved the issue and restored power to the component.

Figure 21:
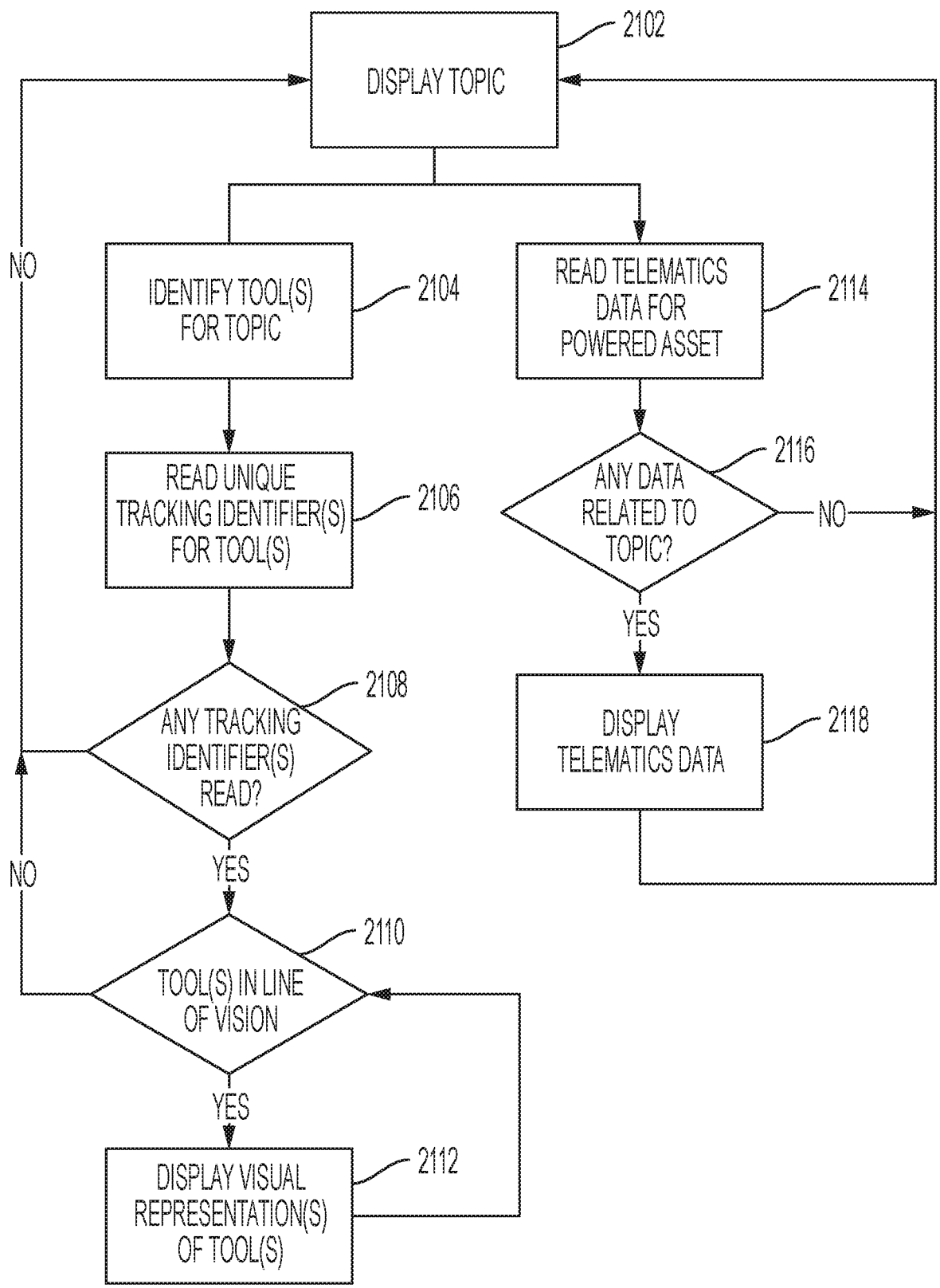

Turning now to FIG. 21, this figure provides another exemplary flowchart of processes and operations that may be completed in accordance with various embodiments to provide an augmented reality environment while the user is viewing a topic. However, in this instance, the management system 110 and/or user computing entity 105 may be configured to read unique tracking identifiers directly from the tool(s) 103 associated with the topic instead of from the non-powered asset(s) 107 where the tool(s) 103 may be located. Several of the steps/operations shown in FIG. 21 are similar to steps/operations described above with respect to the flowchart shown in FIG. 20.

At step/operation 2102, the topic is displayed. For example, the management system 110 and/or user computing entity 105 may display the topic to the user via the AR/VR user interface of the user computing entity 105. At step/operation 2104, the management system 110 and/or user computing entity 105 may determine whether the topic involves any tools 103. For example, the topic may be directed to a maintenance task to be completed for a component of the powered asset 100. Accordingly, one or more tools 103 may be needed by the user to complete the task. Such tools 103 may be mentioned in the instructions (e.g., text data) for the task that are currently displayed on the AR/VR user interface. Therefore, the management system 110 and/or user computing entity 105 may be configured to search the data for the topic and identify any occurrences of tools 103 found in the data.

As previously discussed, a tool 103 may be associated with a unique tracking identifier. Therefore, in particular embodiments, the management system 110 and/or user computing entity 105 may read the unique tracking identifier(s) for the tool(s) 103 involved in the topic at step/operation 2106. For instance, in some embodiments, a tool 103 may store the unique tracking identifier in text, a barcode, a tag, a QR code, and/or the like that is readable. Here, the text, barcode, tag, QR code, and/or the like may be affixed to the tool 103. Therefore, the tool 103 may be present in the user's physical surroundings and the user computing entity 105 being used by the user may be configured to read (e.g., scan) the unique tracking identifier for the tool 103 from the text, barcode, tag, QR code, and/or the like.

Next, the management system 110 and/or user computing entity 105 determines whether the unique tracking identifier has been read for any of the tool(s) 103 at step/operation 2108. If so, then the management system 110 and/or user computing entity 105 determines whether any of the tool(s) 103 are visible in the user's current line of vision at step/operation 2110.

For example, the unique tracking identifier may serve as a marker. Here, the management system 110 and/or the user computing entity 105 may configured to use one or more markers placed in the physical environment as a point of reference to help the management system 110 and/or the user computing entity 105 determine whether a particular tool 103 is in the user's line of vision. When camera of the user computing entity 105 detects a marker (e.g., the unique tracking identifier from a QR code found on an item located in the line of vision), the management system 110 (e.g., receiving information/data on the detection of the marker from the user computing entity 105) and/or the user computing entity 105 compares the information/data from the marker with all the markers it is aware of. Once the management system 110 and/or the user computing entity 105 finds a match with a particular tool 103, it uses the marker's information/data to determine the tool 103 is located in the user's field of vision, as well as mathematically determine the pose of the camera so that it can then display a representation of the tool 103 at the appropriate position on the AR/VR user interface.

In instances in which makers may not be present, the management system 110 and/or user computing entity 105 may gather information/data from the user computing entity 105 and use a recognition algorithm to look for patterns, colors, and/or other features that might identify the user's line of vision. Such information/data may include, for example, location data via GPS, geographic data, accelerometer data, compass data, internal clock data, and/or the like. Those of ordinary skill in the art can envision other processes, mechanism, and data that may be used in determining what physical objects are currently in the user's line of vision.

Accordingly, if the management system 110 and/or the user computing entity 105 determines one or more of the tool(s) 103 referenced in the topic are visible in the user's line of vision, then a visual representation of each of the one or more tool(s) 103 is displayed on the AR/VR user interface at step/operation 2112. Depending on the embodiment, the visual representation for a tool 103 may be, for example, a 2D or 3D digital image of the tool 103 in any of a variety of formats, such as JPEG, JFIF, JPEG2000, EXIF, TIFF, RAW, DIV, GIF, BMP, PNG, PPM, and/or the like. In other embodiments, the visual representation may be a text description of the tool 103 read from a document in any of a variety of formats, such as DOCX, HTML5, TXT, PDF, and/or the like. In other embodiments, the visual representation may be a video showing the tool 103 in any of a variety of formats, such as MOV, AVI, MP4, MKV, and/or the like. Those of ordinary skill in the art can envision other forms of visual representations of the tool(s) 103 that can be used in light of this disclosure.

In addition, in some embodiments, the visual representation(s) of the tool(s) 103 may be positioned on the AR/VR user interface so that they are superimposed over a position in the user's line of vision where the tool(s) 103 are located in the physical environment. This can allow the user to identify where each of the tool(s) 103 is located so that the tool(s) 103 can be gathered for use by the user.

As previously noted, in particular embodiments, additional information/data may be gathered and displayed on the AR/VR user interface associated with the topic. For instance, telematics information/data may be gathered from the powered asset 100 and such information/data may be displayed on the AR/VR user interface to assist the user. In some embodiments, the telematics information/data gathered from the powered asset 100 may be filtered based on the topic being viewed by the user. Therefore, the management system 110 and/or user computing entity 105 may be configured to filter the telematics information/data so that only the information/data that is relevant to the component is displayed to the user.

Therefore, the telematics information/data is read by the management system 110 and/or user computing entity 105 at step/operation 2114. As noted, in some embodiments, the information/data may be filtered based on the topic being displayed to the user. Thus, the management system 110 and/or user computing entity 105 determines whether any of the telematics information/data is applicable to the topic at step/operation 2116. If so, then the management system 110 and/or user computing entity 105 displays the applicable telematics information/data on the AR/VR user interface at step/operation 2118. Again, it is noted that in some embodiments, the management system 110 and/or user computing entity 105 may be configured to determine what telematics information/data is relevant to the topic before reading the telematics information/data for the powered asset 100 and then only reading the relevant telematics information/data. In other words, in some embodiments, steps/operations 2114 and 2116 shown in FIG. 21 may be reversed.

h. Providing Data Files and/or Modules

In various embodiments, the technical data associated with the item (e.g., data modules for topics associated with the item) may be stored and/or provided in accordance with S1000D standards. For example, the data modules may comprise header and/or preface data in accordance with S1000D standards. In particular, S1000D standards require a document to be broken down into individual data modules that are identified via XML and/or SGML tags, labels, and/or metadata and that are organized into a hierarchical XML and/or SGML structure. In various embodiments, the XML and/or SGML files and/or data stored therein may be converted to JSON formatted data and/or files. In various embodiments, the JSON formatted data and/or files may be provided to a user computing entity 105 for an AR/VR display of information/data via the AR/VR user interface.

Figure 22:
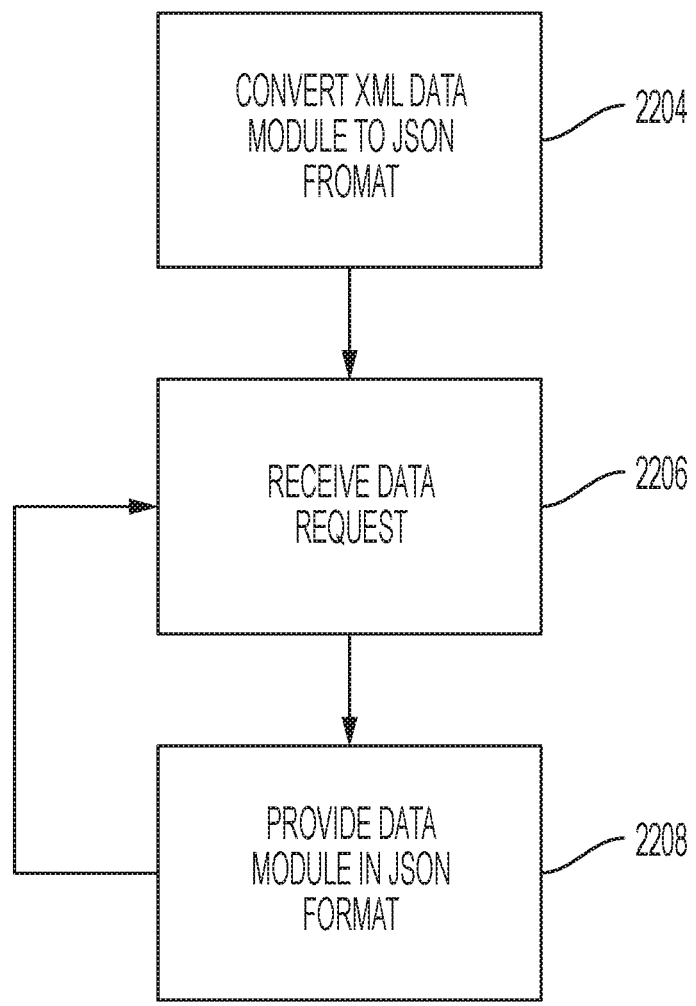

FIG. 22 provides a flowchart illustrating various processes, operations, and procedures that may be completed in various embodiments. At step/operation 2202, one or more XML and/or SGML formatted files (e.g., data modules) are converted to JSON format. For example, the management system 110 and/or the user computing entity 105 may access one or more XML and/or SGML formatted data modules and convert the data module to JSON format. The converted data modules may then be stored by the management system 110 and/or the user computing entity 105. For example, the one or more JSON formatted data modules may be stored in at least one of memory 310, 315, 422a, or 424b. In various embodiments, the data modules converted to and/or stored in JSON format may be in accordance with S1000D standards. For example, the data modules converted to and/or stored in JSON format may be configured to permit the updating of single data modules without necessarily changing the path down the XML tree or other hierarchical structure which points to them. By partitioning and classifying the information/data associated with the item in this way, the information/data can be shared among many publications and updating of data/information within data modules in the underlying S1000D (e.g., XML, SGML, or other hierarchically structured) document will automatically update the dependent publications.

At step/operation 2204, a data request is received. For example, the management system 110 and/or the user computing entity 105 may receive a data request. For example, a user (e.g., operating a user computing entity 105) may select a component, topic, request an AR/VR interactive feature preview or smart preview, and/or the like via the AR/VR user interface. The data request may identify a particular data module. At step/operation 2206, the data module can be provided in JSON format. For example, the management system 110 and/or the user computing entity 105 may provide the data module in JSON format and at least a portion of the data module may be provided via the AR/VR user interface (e.g., via an augmented or virtual interface of the user computing entity 105). For example, the data module identified by the received data request may be provided in JSON format. Providing the data module(s) in JSON format may allow the data module(s) to be transmitted and/or processed more quickly than if the data module(s) were provided in XML and/or SGML format.

The invention claimed is:

1. A method for providing an augmented reality environment to a user interacting with technical data associated with a powered asset, the method comprising:

causing display, by one or more processors of a user computing entity, of at least a portion of a digital model of the powered asset via an augmented reality user interface executing on the user computing entity, wherein (a) the augmented reality user interface is configured to display the portion of the digital model superimposed over at least a first portion of a line of vision for the user to simulate the augmented reality environment, (b) the portion of the digital model comprises one or more components of the powered asset, and (c) the one or more components are selectable via the augmented reality user interface;

receiving, by the one or more processors, first input of the user selecting a particular component of the one or more components;

responsive to receiving the first input, causing display, by the one or more processors, of a plurality of topics associated with the particular component via the augmented reality user interface, wherein (a) the augmented reality user interface is configured to display the plurality of topics superimposed over at least a second portion of the line of vision for the user, and (b) each of the plurality of topics is selectable via the augmented reality user interface;

receiving, by the one or more processors, second input of the user selecting a topic of the plurality of topics, wherein the topic of the plurality of topics comprises instructions for performing a task with respect to the particular component;

responsive to receiving the second input, causing display, by the one or more processors, of the instructions for performing the task on the augmented reality user interface, wherein (a) the augmented reality user interface is configured to display the instructions superimposed over at least a third portion of the line of vision for the user, and (b) the instructions identify a tool used in performing at least one of the instructions; and responsive to the user moving the line of vision to view a non-powered asset in which the tool is located, causing display, by the one or more processors, of a visual representation of the tool on the augmented reality user interface, wherein the augmented reality user interface is configured to display the visual representation of the tool superimposed over the non-powered asset viewable in the line of vision for the user.

2. The method of claim 1, wherein causing display of the visual representation of the tool superimposed over the non-powered asset viewable in the line of vision for the user is performed by:

reading a unique tracking identifier for the non-powered asset by the user computing entity;

determining, by the one or more processors, a location of the non-powered asset is in the line of vision of the user based on the reading of the unique tracking identifier; and causing display, by the one or more processors, of the visual representation of the tool superimposed over the non-powered asset, wherein the tool is associated with the non-powered asset so that the tool is considered to be located where the non-powered asset is located.

3. The method of claim 2, wherein the non-powered asset comprises a beacon configured to at least one of transmit or advertise data comprising the unique tracking identifier that is read by the user computing entity.

4. The method of claim 2, wherein the non-powered asset comprises a tag comprising the unique tracking identifier and the user computing entity comprises a reader configured to scan the tag to read the unique tracking identifier.

5. The method of claim 1, wherein causing display of the visual representation of the tool superimposed over the non-powered asset viewable in the line of vision for the user is performed by:

reading a unique tracking identifier for the tool by the user computing entity;

determining, by the one or more processors, a location of the tool is in the line of vision of the user based on the reading of the unique tracking identifier; and displaying the visual representation of the tool superimposed over the non-powered asset based on the location of the tool.

6. The method of claim 1 further comprising:

receiving telematics data for the particular component from the powered asset by the user computing entity; and responsive to receiving the telematics data, causing display, by the one or more processors, of the telematics data, wherein the augmented reality user interface is configured to display the telematics data superimposed over at least a fourth portion of the line of vision for the user.

7. The method of claim 1 further comprising:

receiving telematics data from the powered asset by the user computing entity;

determining, by the one or more processors, specific data from the telematics data is related to performing the task; and causing display, by the one or more processors, of the specific data from the telematics data, wherein the augmented reality user interface is configured to display the specific data superimposed over at least a fifth portion of the line of vision for the user.

8. A computing system configured for providing an augmented reality environment to a user interacting with technical data associated with a powered asset, the computing system comprising at least one processor and at least one non-transitory memory including program code, the at least one non-transitory memory and the program code configured to, with the at least one processor, cause the computing system to at least:

cause display of at least a portion of a digital model of the powered asset via an augmented reality user interface executing on the computing system wherein (a) the augmented reality user interface is configured to display the portion of the digital model superimposed over at least a first portion of a line of vision for the user to simulate the augmented reality environment, (b) the portion of the digital model comprises one or more components of the powered asset, and (c) the one or more components are selectable via the augmented reality user interface;

receive first input of the user selecting a particular component of the one or more components;

responsive to receiving the first input, cause display of a plurality of topics associated with the particular component via the augmented reality user interface, wherein (a) the augmented reality user interface is configured to display the plurality of topics superimposed over at least a second portion of the line of vision for the user, and (b) each of the plurality of topics is selectable via the augmented reality user interface;

receive second input of the user selecting a topic of the plurality of topics, wherein the topic of the plurality of topics comprises instructions for performing a task with respect to the particular component;

responsive to receiving the second input, cause display of the instructions for performing the task on the augmented reality user interface, wherein (a) the augmented reality user interface is configured to display the instructions superimposed over at least a third portion of the line of vision for the user, and (b) the instructions identify a tool used in performing at least one of the instructions; and responsive to the user moving the line of vision to view a non-powered asset in which the tool is located, cause display of a visual representation of the tool on the augmented reality user interface, wherein the augmented reality user interface is configured to display the visual representation of the tool superimposed over the non-powered asset viewable in the line of vision for the user.

9. The computing system of claim 8, wherein the at least one non-transitory memory and the program code are configured to, with the at least one processor, cause the computing system to cause display of the visual representation of the tool superimposed over the non-powered asset viewable in the line of vision for the user by:

reading a unique tracking identifier for the non-powered asset;

determining a location of the non-powered asset is in the line of vision of the user based on the reading of the unique tracking identifier; and causing display of the visual representation of the tool superimposed over the non-powered asset, wherein the tool is associated with the non-powered asset so that the tool is considered to be located where the non-powered asset is located.

10. The computing system of claim 9, wherein the non-powered asset comprises a beacon configured to at least one of transmit or advertise data comprising the unique tracking identifier that is read by the computing system.

11. The computing system of claim 9, wherein the non-powered asset comprises a tag comprising the unique tracking identifier and the computing system comprises a reader configured to scan the tag to read the unique tracking identifier.

12. The computing system of claim 8, wherein the at least one non-transitory memory and the program code are configured to, with the at least one processor, cause the computing system to cause display of the visual representation of the tool superimposed over the non-powered asset viewable in the line of vision for the user is performed by:

reading a unique tracking identifier for the tool;

determining a location of the tool is in the line of vision of the user based on the reading of the unique tracking identifier; and displaying the visual representation of the tool superimposed over the non-powered asset based on the location of the tool.

13. The computing system of claim 8, wherein the at least one non-transitory memory and the program code are configured to, with the at least one processor, cause the computing system to:

receive telematics data for the particular component from the powered asset; and responsive to receiving the telematics data, cause display of the telematics data, wherein the augmented reality user interface is configured to display the telematics data superimposed over at least a fourth portion of the line of vision for the user.

14. The computing system of claim 8, wherein the at least one non-transitory memory and the program code are configured to, with the at least one processor, cause the computing system to:

receive telematics data from the powered asset;

determine specific data from the telematics data is related to performing the task; and cause display of the specific data from the telematics data, wherein the augmented reality user interface is configured to display the specific data superimposed over at least a fifth portion of the line of vision for the user.

15. A non-transitory computer storage medium comprising instructions providing an augmented reality environment to a user interacting with technical data associated with a powered asset and via a user computing entity, the instructions being configured to cause one or more processors to at least perform operations configured to:

cause display of at least a portion of a digital model of the powered asset via an augmented reality user interface executing on the user computing entity, wherein (a) the augmented reality user interface is configured to display the portion of the digital model superimposed over at least a first portion of a line of vision for the user to simulate the augmented reality environment, (b) the portion of the digital model comprises one or more components of the powered asset, and (c) the one or more components are selectable via the augmented reality user interface;

receive first input of the user selecting a particular component of the one or more components;

responsive to receiving the first input, cause display of a plurality of topics associated with the particular component via the augmented reality user interface, wherein (a) the augmented reality user interface is configured to display the plurality of topics superimposed over at least a second portion of the line of vision for the user, and (b) each of the plurality of topics is selectable via the augmented reality user interface;

receive second input of the user selecting a topic of the plurality of topics, wherein the topic of the plurality of topics comprises instructions for performing a task with respect to the particular component;

responsive to receiving the second input, cause display of the instructions for performing the task on the augmented reality user interface, wherein (a) the augmented reality user interface is configured to display the instructions superimposed over at least a third portion of the line of vision for the user, and (b) the instructions identify a tool used in performing at least one of the instructions; and responsive to the user moving the line of vision to view a non-powered asset in which the tool is located, cause display of a visual representation of the tool on the augmented reality user interface, wherein the augmented reality user interface is configured to display the visual representation of the tool superimposed over the non-powered asset viewable in the line of vision for the user.

16. The non-transitory computer storage medium of claim 15, wherein the instructions are further configured to cause the one or more processors to at least perform operations configured to cause display of the visual representation of the tool superimposed over the non-powered asset viewable in the line of vision for the user by:

reading a unique tracking identifier for the non-powered asset;

determining a location of the non-powered asset is in the line of vision of the user based on the reading of the unique tracking identifier; and causing display of the visual representation of the tool superimposed over the non-powered asset, wherein the tool is associated with the non-powered asset so that the tool is considered to be located where the non-powered asset is located.

17. The non-transitory computer storage medium of claim 16, wherein the non-powered asset comprises a beacon configured to at least one of transmit or advertise data comprising the unique tracking identifier.

18. The non-transitory computer storage medium of claim 16, wherein the non-powered asset comprises a tag comprising the unique tracking identifier configured to be scanned.

19. The non-transitory computer storage medium of claim 15, wherein the instructions are further configured to cause the one or more processors to at least perform operations configured to cause display of the visual representation of the tool superimposed over the non-powered asset viewable in the line of vision for the user is performed by:

reading a unique tracking identifier for the tool;
determining a location of the tool is in the line of vision of the user based on the reading of the unique tracking identifier; and
displaying the visual representation of the tool superimposed over the non-powered asset based on the location of the tool.

20. The non-transitory computer storage medium of claim 15, wherein the instructions are further configured to cause the one or more processors to at least perform operations configured to:
receive telematics data for the particular component from the powered asset; and
responsive to receiving the telematics data, cause display of the telematics data, wherein the augmented reality user interface is configured to display the telematics data superimposed over at least a fourth portion of the line of vision for the user.

21. The non-transitory computer storage medium of claim 15, wherein the instructions are further configured to cause the one or more processors to at least perform operations configured to:
receive telematics data from the powered asset;
determine specific data from the telematics data is related to performing the task; and
cause display of the specific data from the telematics data, wherein the augmented reality user interface is configured to display the specific data superimposed over at least a fifth portion of the line of vision for the user.

* * * * *